US012719182B2

(12) United States Patent
Choi et al.

(10) Patent No.: US 12,719,182 B2
(45) Date of Patent: Aug. 25, 2026

(54) ANTENNA STRUCTURE AND ELECTRONIC DEVICE COMPRISING SAME

(71) Applicant: Samsung Electronics Co., Ltd., Suwon-si (KR)

(72) Inventors: Dabin Choi, Suwon-si (KR); Dongsik Shin, Suwon-si (KR); Jonghwa Kim, Suwon-si (KR); Jihye Kim, Suwon-si (KR); Haegweon Park, Suwon-si (KR); Seunghwan Yoon, Suwon-si (KR); Jongwook Zeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 18/075,864

(22) Filed: Dec. 6, 2022

(65) Prior Publication Data

US 2023/0170628 A1 Jun. 1, 2023

Related U.S. Application Data

(63) Continuation of application No. PCT/KR2021/007174, filed on Jun. 8, 2021.

(30) Foreign Application Priority Data

Jun. 8, 2020 (KR) ........................ 10-2020-0069330

(51) Int. Cl.

*H01Q 21/24* (2006.01)
*H01Q 1/24* (2006.01)
*H01Q 9/04* (2006.01)

(52) U.S. Cl.

CPC ............. *H01Q 21/24* (2013.01); *H01Q 1/243* (2013.01); *H01Q 9/0414* (2013.01); *H01Q 9/045* (2013.01)

(58) Field of Classification Search

CPC ...... H01Q 21/24; H01Q 21/065; H01Q 9/045; H01Q 1/243; H01Q 9/0414; H01Q 1/38;
(Continued)

(56) References Cited

U.S. PATENT DOCUMENTS 6,104,347 A 8/2000 Snygg et al.
6,121,929 A 9/2000 Olson et al.
(Continued)

FOREIGN PATENT DOCUMENTS

CN 102856640 B 6/2014
CN 104319462 A 1/2015
(Continued)

OTHER PUBLICATIONS

Chongqing University of Posts and Telecommunications, Yin Bo, Dec. 8, 2017 (Year: 2017) CN107453044.*
(Continued)

*Primary Examiner* — Wei (Victor) Y Chan
(74) *Attorney, Agent, or Firm* — Jefferson IP Law, LLP

(57) ABSTRACT

The disclosure relates to a 5$^{th}$ generation (5G) or pre-5G communication system for supporting higher data transfer rates than 4$^{th}$ generation (4G) communication systems, such as long term evolution (LTE). An antenna device is provided. The antenna device includes a first feeding line for a first polarization, and an antenna. The antenna includes a radiation face and at least one corresponding face on which the first polarization is formed. An angle formed by the at least one corresponding face and a direction of the first polarization may be smaller than an angle formed by the at least one corresponding face and a direction of a polarization perpendicular to the first polarization.

15 Claims, 26 Drawing Sheets

(58) Field of Classification Search
CPC .... H01Q 9/0407; H01Q 9/0457; H01Q 21/08; H01Q 21/28; H01Q 9/0428
See application file for complete search history.

(56) References Cited

U.S. PATENT DOCUMENTS

| | | | | |
|---|---|---|---|---|
| 6,297,774 | B1 | 10/2001 | Chung | |
| 7,852,265 | B2 | 12/2010 | Milano et al. | |
| 8,193,990 | B2 | 6/2012 | Nakabayashi et al. | |
| 9,130,262 | B2 | 9/2015 | Park et al. | |
| 9,190,728 | B2 | 11/2015 | Cheng et al. | |
| 2006/0256013 | A1 | 11/2006 | Lazar | |
| 2011/0128201 | A1 | 6/2011 | Ju et al. | |
| 2013/0027259 | A1 | 1/2013 | Fujita et al. | |
| 2013/0321214 | A1* | 12/2013 | Zhou .................... | H01Q 9/0428 343/700 MS |
| 2017/0250471 | A1 | 8/2017 | Lee | |
| 2018/0191070 | A1 | 7/2018 | Suzuki | |
| 2019/0044238 | A1 | 2/2019 | Schuhler et al. | |
| 2020/0021037 | A1 | 1/2020 | Wu et al. | |
| 2020/0287298 | A1* | 9/2020 | Ueda .................... | H01Q 9/0407 |

FOREIGN PATENT DOCUMENTS

| | | | | |
|---|---|---|---|---|
| CN | 105990682 A | 10/2016 | | |
| CN | 107453044 A | 12/2017 | | |
| CN | 108808232 A | 11/2018 | | |
| CN | 210692769 U | 6/2020 | | |
| EP | 0 891 643 B1 | 7/2000 | | |
| JP | H08-023223 A | 1/1996 | | |
| JP | H11-068448 A | 3/1999 | | |
| JP | 2000-077929 A | 3/2000 | | |
| JP | 2006-025035 A | 1/2006 | | |
| JP | 2008-205855 A | 9/2008 | | |
| KR | 10-2004-0008983 A | 1/2004 | | |
| KR | 10-1240353 B1 | 3/2013 | | |
| KR | 10-2014-0119562 A | 10/2014 | | |
| KR | 10-1743962 B1 | 6/2017 | | |
| KR | 10-1845937 B1 | 4/2018 | | |
| WO | WO-9934477 A1 * | 7/1999 | ........... | H01Q 9/0457 |

OTHER PUBLICATIONS

Chongqing University of Posts and Telecommunications, Yin Bo, Dec. 8, 2017 Translation CN107453044.*

A (Furukawa Electric Co., Ltd.) Jan. 26, 2006 (Year: 2006), Inoue Daisuke JP2006025035.*

A (Furukawa Electric Co., Ltd.) Jan. 26, 2006 Translation (Year: 2006), Inoue Daisuke JP2006025035.*

Translation WO9934477. Date: Jul. 8, 1999 and Inventor: Hsin-Hsien Chung; Year: 1999 (Year: 1999).*

Yeon-Geun Lim et al., Relationship between Cross-Polarization Discrimination (XPD) and Spatial Correlation in Indoor Small-Cell MIMO Systems, arXiv:1707.00227v2 [cs.IT], Dec. 6, 2017.

JiříŠebesta et al., Radioreleěový spoj s křížovou polarizací a systémem XPIC (Cross-polarization radio-relay link with XPIC system), elektrorevue ISSN 1213-1539, vol. 15, No. 4, Aug. 2013.

International Search Report dated Sep. 27, 2021, issued in International Application No. PCT/KR2021/007174.

Korean Office Action dated Apr. 9, 2024, issued in Korean Patent Application No. 10-2020-0069330.

Extended European Search Report dated Nov. 7, 2023, issued in European Patent Application No. 21821655.4.

Indian Office Action dated Nov. 8, 2023, issued in Indian Patent Application No. 202317001429.

Mak et al., Compact Low Cost Dual Polarized Adaptive Planar Phased Array for WLAN; JEEE Transactions on Antennas and Propagation, vol. 53, No. 8. Aug. 2005.

Korean Notice of Patent Grant dated Nov. 6, 2024, issued in Korean Patent Application No. 10-2020-0069330.

European Communication pursuant to Article 94(3) EPC dated Jul. 14, 2025; European Appln. No. 21 821 655.4-1201.

Chinese Office Action with English translation dated Jan. 31, 2026; Chinese Appln. No. 202180041418.5.

Zhou et al.; Antenna and Radio Waves; Xidian University Press; Nov. 30, 1994.

Chinese Office Action with English translation dated Jul. 9, 2026; Chinese Appln. No. 202180041418.5.

* cited by examiner

281a

281b

281c

830

ANTENNA STRUCTURE AND ELECTRONIC DEVICE COMPRISING SAME

CROSS-REFERENCE TO RELATED APPLICATION(S)

This application is a continuation application, claiming priority under § 365(c), of an International application No. PCT/KR2021/007174, filed on Jun. 8, 2021, which is based on and claims the benefit of a Korean patent application number 10-2020-0069330, filed on Jun. 8, 2020, in the Korean Intellectual Property Office, the disclosure of which is incorporated by reference herein in its entirety.

BACKGROUND

1. Field

The disclosure relates to an antenna structure, and an electronic device including the antenna structure.

2. Description of Related Art

To meet a demand on wireless data traffic which has been in an increasing trend after a $4^{th}$ generation (4G) communication system was commercialized, there is an ongoing effort to develop an improved $5^{th}$ generation (5G) communication system or a pre-5G communication system. For this reason, the 5G communication system or the pre-5G communication system is called a beyond 4G network communication system or a post long term evolution (LTE) system.

To achieve a high data transfer rate, the 5G communication system is considered to be implemented in an mmWave band (e.g., such as a 60 GHz band). To reduce a propagation path loss at the mmWave band and to increase a propagation transmission distance, beamforming, massive multiple input multiple output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud radio access network (RAN), an ultra-dense network, device to device (D2D) communication, a wireless backhaul, a moving network, cooperative communication, coordinated multi-points (CoMP), and reception interference cancellation, or the like are being developed in the 5G communication system.

In addition thereto, hybrid frequency shift keying and quadrature amplitude modulation (FQAM) and sliding window superposition coding (SWSC) as an advanced coding modulation (ACM) technique and filter bank multi carrier (FBMC), non orthogonal multiple access (NOMA), and sparse code multiple access (SCMA), or the like as an advanced access technology are being developed in the 5G system.

In order to improve communication performance, it is required to improve a cross polarization ratio (CPR) in a dual-polarized antenna.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna structure including a radiation element configured such that a cross-polarization component is constructed to be smaller in a radiation region, and an electronic device including the antenna structure.

Another aspect of the disclosure is to provide an antenna structure including a radiation element configured such that a co-polarization component is constructed to be larger in a radiation region, and an electronic device including the antenna structure.

Another aspect of the disclosure is to provide an antenna structure having cross polarization ratio (CPR) performance improved through an additional construction or a radiation element configured such that a co-polarization component is constructed to be larger or a cross-polarization component is constructed to be smaller, and an electronic device including the antenna structure.

Additional aspects will be set forth in part in the description which follows and, in part, will be apparent from the description, or may be learned by practice of the presented embodiments.

In accordance with an aspect of the disclosure, an antenna device is provided. The antenna device includes a first feeding line for a first polarization and an antenna. The antenna may include a radiation face and at least one corresponding face on which the first polarization is formed. An angle formed by the at least one corresponding face and a direction of the first polarization may be smaller than an angle formed by the at least one corresponding face and a direction of a polarization perpendicular to the first polarization.

In accordance with another aspect of the disclosure, a massive multiple input multiple output (MIMO) unit (MMU) device is provided. The MMU device includes at least one processor and an antenna array including a plurality of antenna elements. A first antenna element among the plurality of antenna elements may be electrically coupled to a first feeding line for a first polarization. The first antenna element may include a radiation face and at least one corresponding face on which the first polarization is formed. An angle formed by the at least one corresponding face and a direction of the first polarization may be smaller than an angle formed by the at least one corresponding face and a direction of a polarization perpendicular to the first polarization.

An apparatus and method according to various embodiments of the disclosure may improve cross polarization ratio (CPR) performance, through a shape of an antenna element for reducing a cross-polarization component of a signal.

Advantages acquired in the disclosure are not limited to the aforementioned advantages, and other advantages not mentioned herein may be clearly understood by those skilled in the art to which the disclosure pertains from the following descriptions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
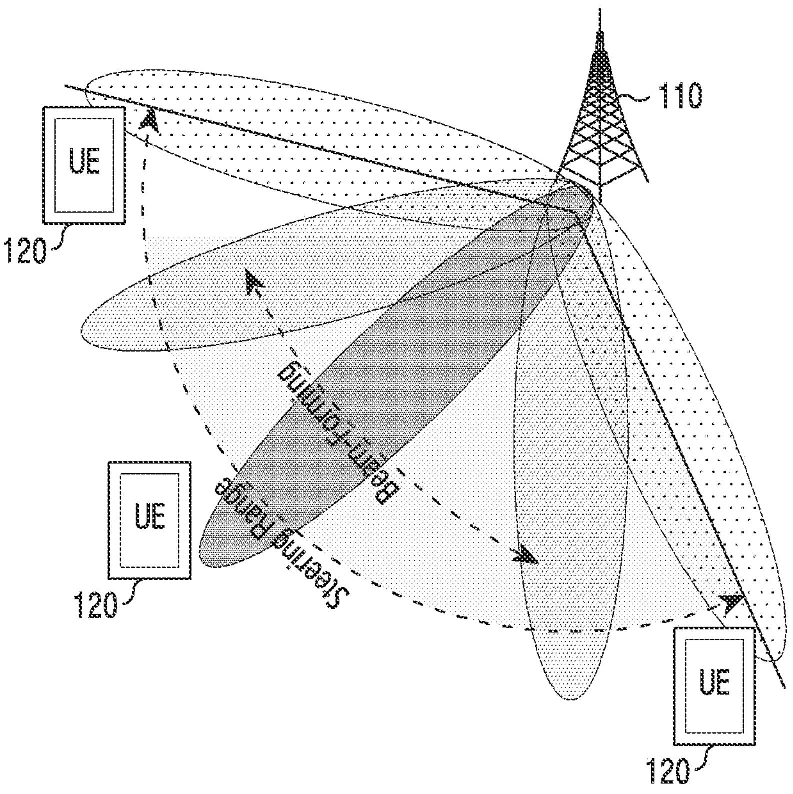
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Hereinafter, the disclosure relates to an antenna structure for a wireless communication system, and an electronic device including the antenna structure. Specifically, the disclosure describes a technique which minimizes a cross-polarization component by cutting or folding at least one side of a radiation element (e.g., a radiation patch) in a dual-polarized antenna, thereby improving cross polarization ratio (CPR) performance for a single-polarized or dual-polarized antenna. In particular, since it is expected to use a device having a much greater number of antennas through a massive MIMO technique, a more efficient antenna design is required in terms of manufacturing time and production cost along with high CPR performance.

Hereinafter, terms used to refer to parts of an electronic device (e.g., a substrate, a printed circuit board (PCB), a flexible PCB (FPCB), a module, an antenna, an antenna element, a circuit, a processor, a chip, a component, and a device), terms used to refer to a shape of the parts (e.g., a construction body, a construction object, a support portion, a contact portion, a protrusion, and an opening), terms used to refer to a connection portion between the construction bodies (e.g., a connection portion, a contact portion, a support portion, a contact construction body, a conductive member, an assembly), terms used to refer to a circuitry (e.g., a PCB, an FPCB, a signal line, a feeding line, a data line, an RF signal line, an antenna line, an RF path, an RF module, and an RF circuit), and the like are exemplified for convenience of explanation. Therefore, the disclosure is not limited to terms described below, and thus other terms having the same technical meaning may also be used. In addition, the term '. . . unit', '. . . device', '. . . member', '. . . body', or the like may imply at least one configuration or may imply a unit of processing a function.

In addition, although an expression 'greater than' or 'less than' is used in the disclosure to determine whether a specific condition is satisfied (or fulfilled), this is for exemplary purposes only and does not exclude an expression of 'greater than or equal to' or 'less than or equal to'. A condition described as 'greater than or equal to' may be replaced with 'greater than' A condition described as 'less than or equal to' may be replaced with 'less than' A condition described as 'greater than or equal to and less than' may be replaced with 'greater than and less than or equal to'.

In addition, although the disclosure describes various embodiments by using terms used in some communication standards (e.g., 3rd generation partnership project (3GPP), institute of electrical and electronics engineers, IEEE (IEEE)), this is for exemplary purposes only. Various embodiments of the disclosure may be easily modified and applied to other communication systems.

FIG. 1 illustrates a wireless communication system according to an embodiment of the disclosure. As part of nodes which use a radio channel, a base station 110 and a terminal 120 are exemplified in a wireless communication environment 100 of FIG. 1.

Referring to FIG. 1, the base station 110 is a network infrastructure which provides a radio access to the terminal 120. The base station 110 has a coverage defined as a specific geographic region, based on a distance capable of transmitting a signal. In addition to the term 'base station', the base station 110 may be referred to as an 'access point (AP)', an 'eNodeB (eNB)', a '5$^{th}$ generation (5G) node', a '5G NodeB (NB)', a 'wireless point', a 'transmission/reception Point (TRP)', an 'access unit', a distributed unit (DU)', a 'radio unit (RU)', a 'remote radio head (RRH)', or other terms having equivalent technical meanings. The base station 110 may transmit a downlink signal or receive an uplink signal.

As a device used by a user, the terminal 120 communicates with the base station 110 through the radio channel. Optionally, the terminal 120 may be operated without user involvement. For example, as a device for performing machine type communication (MTC), the terminal 120 may not be carried by the user. In addition to the term 'terminal', each of the terminal 120 may be referred to as a 'user equipment (UE)', a 'mobile station', a 'subscriber station', a 'customer premises equipment (CPE)', a 'remote terminal', a 'wireless terminal', an 'electronic device', a 'vehicular terminal', a 'user device', or other terms having equivalent technical meanings.

In order to improve communication performance, there is an increase in the number of antennas (or antenna elements) of a device which performs wireless communication. In addition, since the number of RF parts and components for processing an RF signal received or transmitted through the antenna element is also increased, when the communication device is constructed, a spatial gain and cost efficiency are necessarily required while satisfying the communication performance. In order to satisfy these requirements, a dual-polarized antenna is used. Polarization diversity and a signal gain based thereon may be increased as independence on a channel between signals of different polarizations. Accordingly, improvement of a cross polarization ratio (CPR) is necessarily required in the dual-polarized antenna. This is because the CPR is proportional to main communication performance such as a throughput, a bit error rate (BER), polarization (pol) diversity, or the like.

Hereinafter, although components of a wireless device (e.g., a massive MIMO unit (MMU)) coupled to a base station are described for example in order to explain a connection structure of the disclosure and an electronic device including the connection structure, various embodiments of the disclosure are not limited thereto. It is obvious that the connection structure of the disclosure and the electronic device including the connection structure are applicable to the terminal 120 of FIG. 1 and a device which requires a reliable connection structure of other communication parts for signal processing.

Since a multi-antenna technique is used in the existing MIMO system which uses a wide beam, it is required to maximize space diversity. To this end, antennas are deployed such that the antennas are spaced by at least 1λ. Meanwhile, with the introduction of 5G communication, a beamforming technique is used as one of techniques for reducing a propagation path loss and increasing a propagation transmission distance. In general, the beamforming uses a plurality of antennas to concentrate a propagation arrival region or increase directivity of reception intensity for a specific direction. To improve beamforming performance, it is required to deploy antennas in an array antenna such that a distance between the antennas is reduced (e.g., 0.5λ~0.7λ). However, when the distance between the antennas is reduced, interference between adjacent antennas increases, which causes degradation of CPR performance.

Compared to a 4G base station antenna, in case of a 5G base station antenna, CPR performance is more important due to a narrow distance between antennas. In the 4G base station which provides a service by using a wide beam, the wider the antenna spacing, the higher the spatial separation level, thereby improving communication performance, whereas in the 5G base station which provides a service by using a beam of which a beam width is narrow and power density is high, an antenna spacing of an array antenna shall be reduced to widen a beamforming region. As such, since interference between antennas increases due to a narrow antenna spacing of the 5G base station (e.g., gNB of 5G NR, NG-RAN node) antenna compared to the 4G base station (e.g., eNB of LTE) antenna, a technique for avoiding CPR degradation is necessary. Since the CPR performance is also proportional to a throughput and bit error rate (BER) performance, which are main indicators of communication performance, vendors are demanding a high CPR to improve 5G communication performance.

Hereinafter, a principle of a CPR to be improved and an improvement direction in various embodiments of the disclosure will be described with reference to FIGS. 2A, 2B, 2C, 2D, 2E, and 2F. In addition, although the 5G base station has been mentioned as a structural background for improving CPR performance, it is obvious that embodiments of the disclosure are applicable when high CPR performance is optionally required, in addition to a base station (e.g., an LTE base station) supporting a 5G service.

Figure 2A:
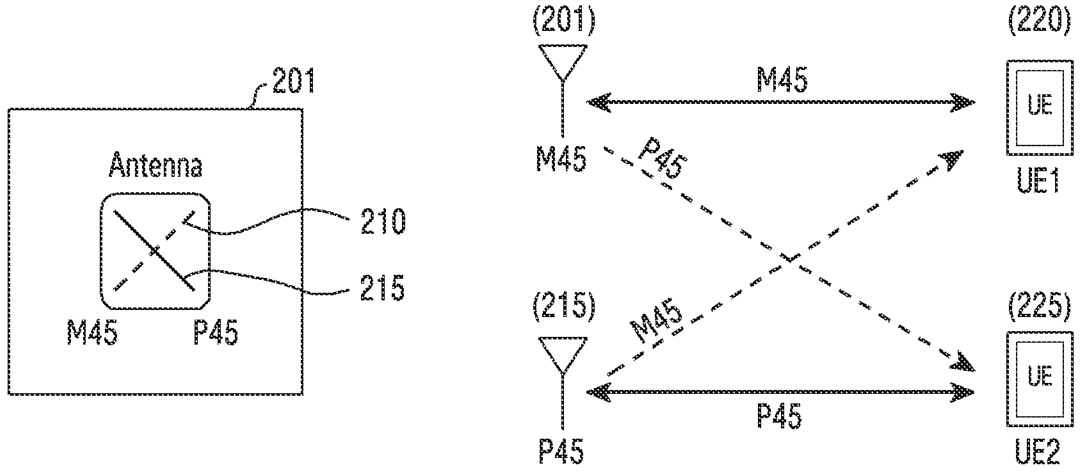
FIG. 2A is a diagram illustrating a cross polarization ratio (CPR) system according to an embodiment of the disclosure.

FIG. 2A is a diagram illustrating a cross polarization ratio (CPR) according to an embodiment of the disclosure. Herein, a polarization means a vibration direction of an electric field, when a radio wave is radiated from an antenna. In this case, a polarization of the electric field radiated from the antenna is defined by a co-polarization (co-pol), and a polarization of the electronic field orthogonal to the co-pol and generated inevitably is referred to as cross-polarization (cross-pol). The CPR is a ratio of the co-pol and the cross-pol. For example, a CPR standard is managed at a radiation angle of 0 degrees (boresight) and ±60 degrees (sector edge) in a horizontal radiation pattern of the antenna. In case of an array antenna, the CPR is affected by CPR performance of all single-elements.

A high CPR indicates a low channel correlation between signals having different polarizations. Polarization diversity may be increased as the signals having the different polarizations undergo independent channels. A dual-polarized antenna is utilized for the polarization diversity. The higher the polarization diversity, the higher the signal gain may be, which causes an increase in channel capacity. Therefore, independency between polarization components in the dual-polarized antenna is utilized as an indicator indicating performance of the dual-polarized antenna.

Referring to FIG. 2A, an antenna 201 may be a dual-polarized antenna including two polarization components. The antenna 201 may include a first element 210 and a second element 215. The first element and the second element may have different polarizations. The polarization of the first element and the polarization of the second element may be configured to be orthogonal to each other. For example, the first element 210 may correspond to a polarization of +45° and the second antenna element 215 may correspond to a polarization of −45°. A component corresponding to a desired polarization in a radiated signal may be referred to as a co-pol component. A component orthogonal to the desired polarization in the radiated signal may be referred to as a cross-pol component.

A signal radiated from the first element 210 may act as a co-pol component for a first terminal 220. Meanwhile, the signal radiated from the first element 210 may act as a cross-pol component for a second terminal 225. Likewise, a signal radiated from the second element 215 may act as a co-pol component for the second terminal 225, but may act as a cross-pol component for the first terminal 220. Likewise, the cross-pol component acts as interference. Therefore, communication performance may be improved when the cross-pol component is low and the co-pol component is high.

As described above, the CPR means a ratio of two polarization components when transmitting a signal in a specific polarization. For example, the CPR represents a ratio of M45 to P45 generated by the first terminal 220, with respect to the first antenna 210. The smaller the size of P45, the greater the difference between the two components, which may result in an increase in the CPR. The CPR may also be referred to as a cross polarization discrimination (XPD), as an equivalent meaning. For example, the XPD may be defined by Equation 1 below.

$$XPD = 20\log\frac{|y_{co}|}{|y_{cross}|} \qquad \text{Equation 1}$$

Herein, $y_{co}$ denotes a signal component transmitted or received in a specific polarization in which a signal is radiated, and $y_{cross}$ denotes a signal component transmitted or received in another polarization.

In an ideal communication system, since each of two polarization components of a dual-polarized antenna does not generate cross-pol components, a signal component of different polarizations, i.e., a cross-pol component, may be completely blocked. However, in a real communication system, since two polarization components are difficult to be completely orthogonal, CPR improvement is necessary. Since the cross-pol component acts as interference, it is required to design an antenna such that the cross-pol component is constructed to be small to improve communication performance. This is because CPR degradation causes interference of a dual polarization formed to increase polarization diversity, which leads to degradation of communication performance.

Figure 2B:
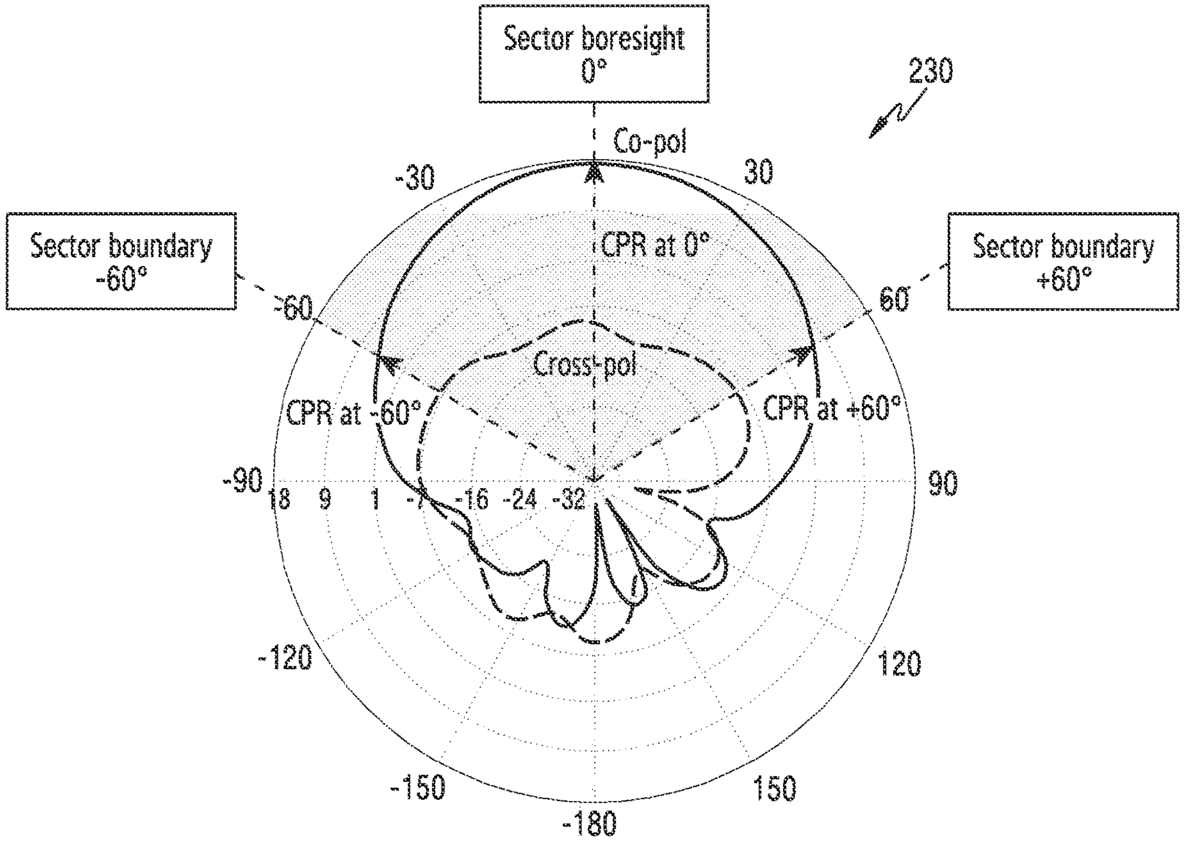
FIG. 2B illustrates an antenna radiation pattern for explaining a CPR system according to an embodiment of the disclosure.

FIG. 2B illustrates an antenna radiation pattern for explaining a CPR according to an embodiment of the disclosure. Hereinafter, an antenna radiation pattern and an electric field are considered in the disclosure to measure the CPR and identify an effect depending on a CPR change. In this case, the CPR may be managed at a boundary of about ±60°, based on a boresight direction (0°) of a sector.

Referring to FIG. 2B, a graph 230 shows a co-pol component and a cross-pol component in an antenna radiation pattern. The CPR is a ratio of the co-pol component to the cross-pol component.

Figure 2C:
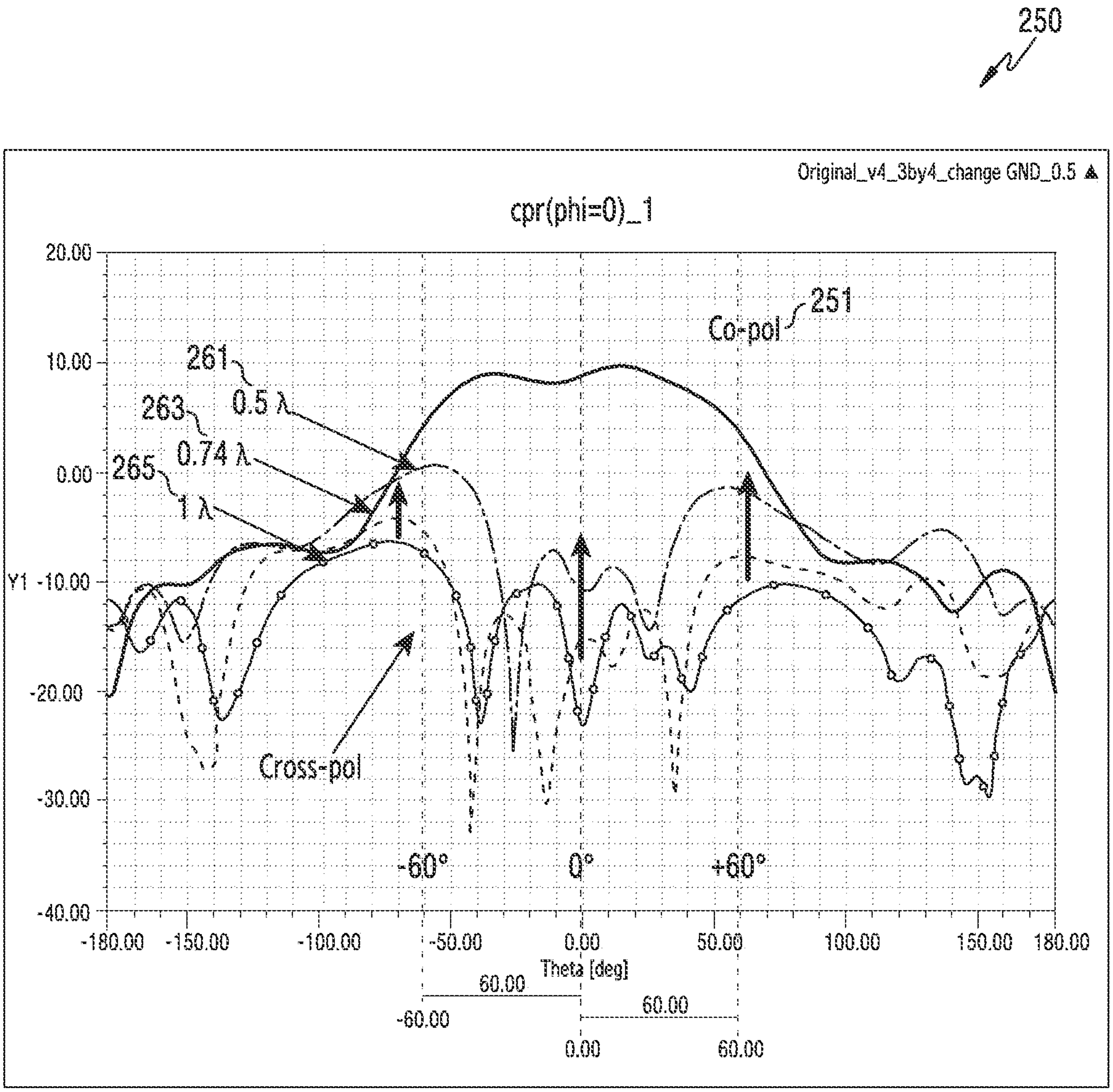
FIG. 2C illustrates a co-pol and a cross-pol pattern, based on a distance system according to an embodiment of the disclosure.

FIG. 2C illustrates a co-pol and a cross-pol pattern, based on a distance according to an embodiment of the disclosure. Herein, a distance between antennas means a distance between antenna elements in an array antenna.

Referring to FIG. 2C, a graph 250 illustrates CPR performance depending on a distance of antennas. A horizontal axis represents an angle of a radiation pattern, and a vertical axis represents a size of a co-pol component 251 or cross-pol components 261, 263, and 265. The first cross-pol component 261 represents a cross-pol component when the distance between antennas is 0.5λ. The second cross-pol component 263 represents a cross-pol component when the distance between the antennas is 0.74λ. The third cross-pol component 265 represents a cross-pol component when the distance between antennas is 1λ. Respective CPR values in representative directions (−60°, 0°, 60°) of the graph 250 are illustrated in the Table 1 below.

TABLE 1

| | CPR | | |
|---|---|---|---|
| | deg | | |
| distance(λ) | −60° | 0° | +60° |
| 1 | 11.94 | 34.98 | 12.51 |
| 0.74 | 8.87 | 28.22 | 9.25 |
| 0.5 | 3.74 | 19.52 | 5.08 |

Referring to the graph 250, it is shown that the cross-pol component is changed more significantly than the co-pol component according to the distance of antennas. In addition, when the distance between antennas is reduced, it is shown that there is an overall increase in a size of the cross-pol component. This may mean that the reduction of the distance between antennas causes degradation of CPR performance. Therefore, hereinafter, various embodiments of the disclosure propose an antenna structure for improving the CPR by reducing the cross-pol component having a relatively large change range.

Figure 2D:
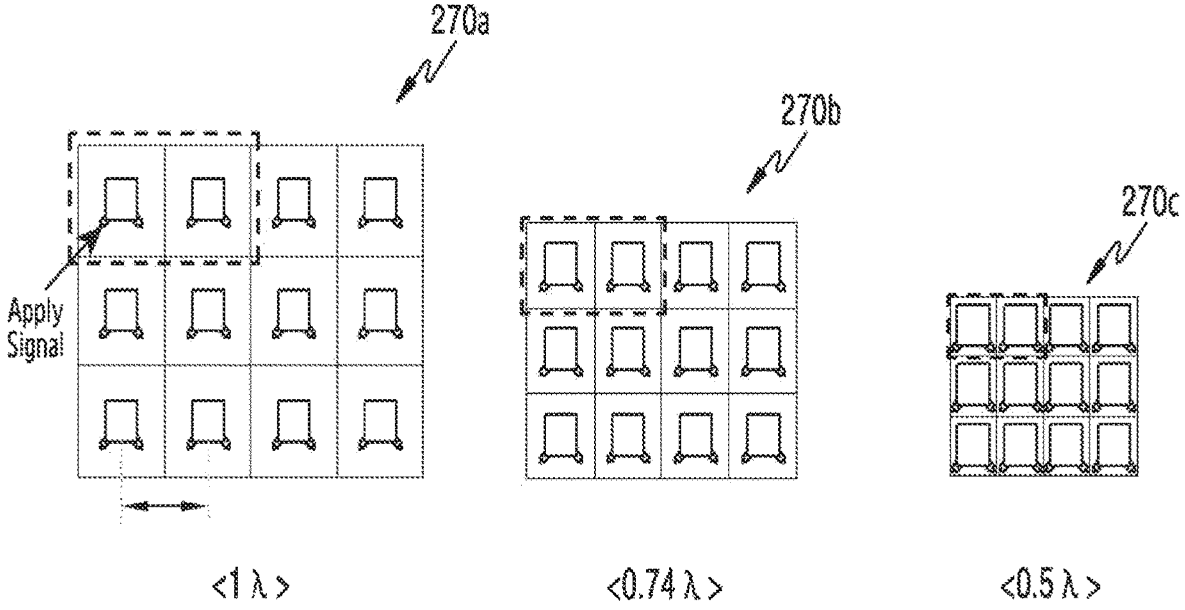
FIGS. 2D, 2E, and 2F illustrate a field distribution having an effect on a proximity element according to a distance between antenna elements system according to an embodiment of the disclosure.
Figure 2E:
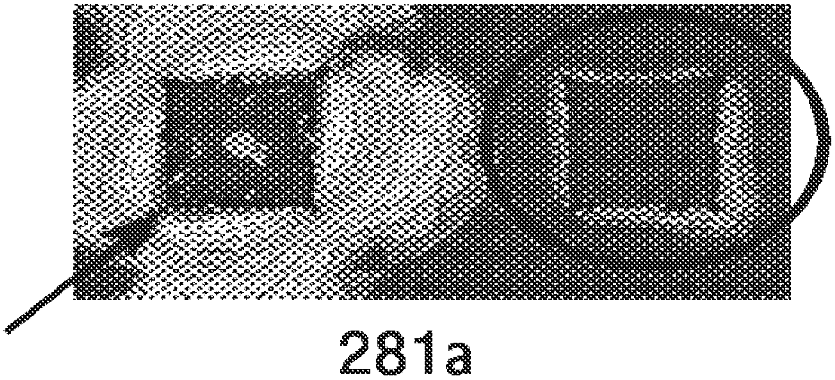
Figure 2E:
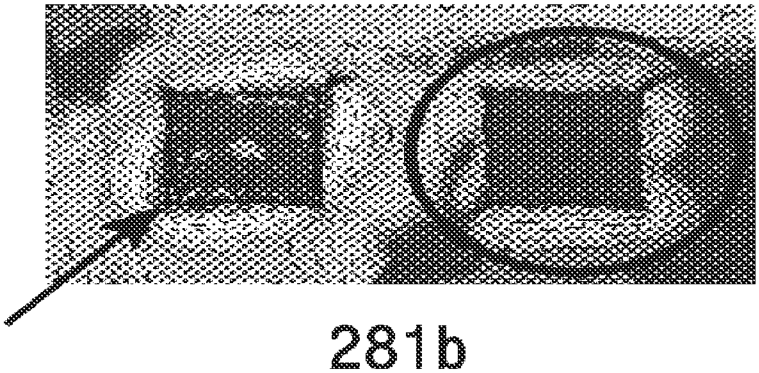
Figure 2E:
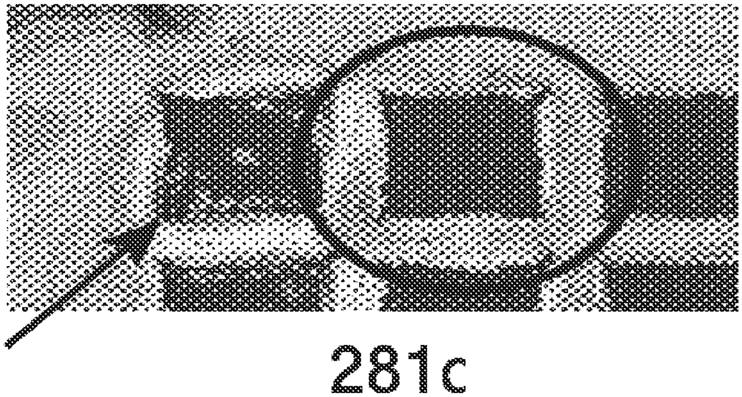
Figure 2F:
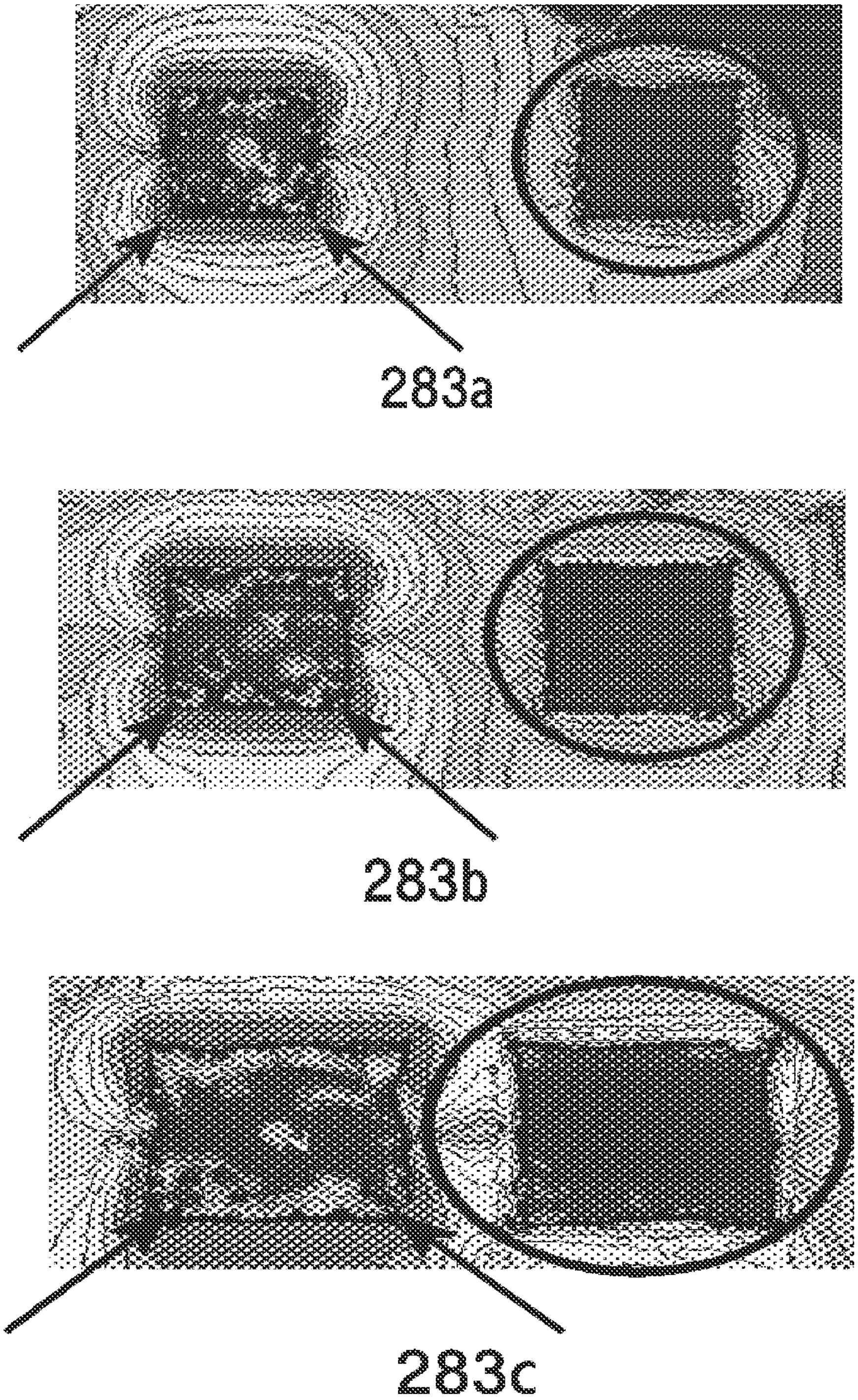

FIGS. 2D, 2E, and 2F illustrate a field distribution having an effect on a proximity element according to a distance between antenna elements according to an embodiment of the disclosure. The proximity element means a peripheral element (e.g., another antenna element adjacent to an antenna element radiating a signal) of a radiation element.

Referring to FIG. 2D, the antenna may include a 3×4 array antenna. The array antenna may include 12 antenna elements in total. Meanwhile, 3×4 is only an example and is not construed as limiting embodiments of the disclosure. According to a distance between the antenna elements, a proximity element may be affected differently by a radiation element. A distance between antenna elements of a first antenna array 270*a* may be 1λ. A distance between antenna elements of a second antenna array 270*b* may be 0.74λ. A distance between antenna elements of a third antenna array 270*c* may be 0.5λ.

It is assumed that a signal is applied to an antenna element (hereinafter, a radiation element) located at a leftmost upper end of each antenna array. For example, a signal is applied to an element corresponding to a co-pol component. Referring to FIG. 2E, a field 281*a* represents a distribution of a cross-pol component for a radiation element of the first antenna array 270*a* and an element (hereinafter, a proximity element) adjacent to the radiation element. A field 281*b* in FIG. 2E represents a distribution of a cross-pol component for a radiation element of the second antenna array 270*b* and a proximity element. A field 281*c* in FIG. 2E represents a distribution of a cross-pol component for a radiation element of the third antenna array 270*c* and a proximity element. In addition, for example, a signal is applied to both an element corresponding to the co-pol component and an element corresponding to the cross-pol component. Referring to FIG. 2F, a field 283*a* represents a field distribution when signals are applied to ports corresponding to a dual polarization of the radiation element of the first antenna array 270*a*. A field 283*b* in FIG. 2F represents a field distribution when signals are applied to ports corresponding to dual polarizations of the radiation element of the second antenna array 270*b*. A field 283*c* in FIG. 2F represents a field distribution when signals are applied to ports corresponding to dual polarizations of a radiation element of the third antenna array 270*c*.

The cross-pol component of the proximity element is increased when a distance between antennas is decreased. For example, the narrower the distance between antennas, the higher the amount of excitation from the radiation element to the proximity element. The increase in the amount of excitation causes a CPR decrease. Since all CPRs shall consider not only a CPR of the radiation element itself but also a CPR of the proximity element, a CPR effect of the proximity element may also be an object to be improved through an embodiment of the disclosure.

When an antenna is viewed from the front, an electric field of the antenna is distributed in a concentrated manner at both ends of an element in the same direction as an antenna polarization direction, and a radio wave is radiated to a space due to the electric field. Regions of both ends where the electric field is concentrated may be referred to as a 'radiation source region' of an antenna element. A polarization of the radio wave is determined to satisfy an electromagnetic boundary condition of an element shape (the electric field is incident only perpendicular to a conductive boundary face) in the radiation source region. Accordingly, various embodiments of the disclosure are to analyze this region in which a polarization is determined and propose an antenna shape capable of improving a CPR and a structure including this.

Figure 3:
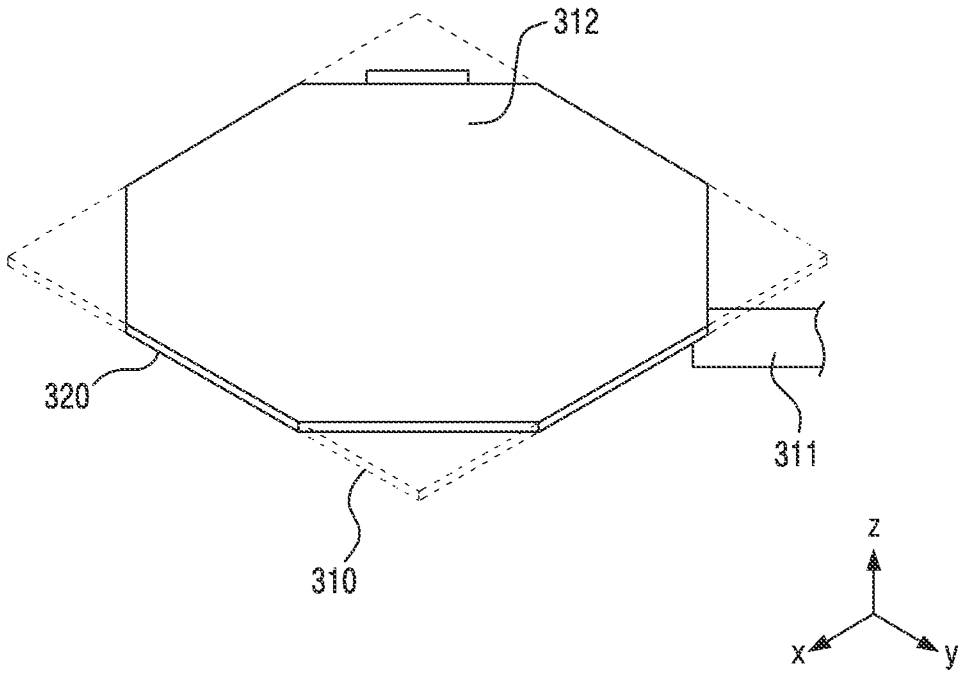
FIG. 3 illustrates an antenna structure according to an embodiment of the disclosure.

FIG. 3 illustrates an antenna structure according to an embodiment of the disclosure. According to an embodiment of the disclosure, an antenna may be an array antenna including a plurality of antenna elements. The antenna is described in FIG. 3, as the antenna element of the antenna array. According to another embodiment of the disclosure, even if the antenna does not have an array shape, embodiments described below may be applied to improve a CPR of an independent antenna.

Referring to FIG. 3, an antenna structure may include a CPR improvement antenna 320, a first feeding unit 311 for a first polarization, and a second feeding unit 312 for a second polarization. According to an embodiment of the disclosure, the first feeding unit 311 and the second feeding unit 312 may radiate a signal through coupling feeding with the CPR improvement antenna 320. In this case, the first feeding unit 311 and the second feeding unit 312 may be disposed in a straight-line structure or a 'L'-shaped structure to feed a signal. Meanwhile, this structure is only an example, and embodiments of the disclosure are not limited to the antenna feeding structure of the straight-line or 'L' structure. In addition, according to another embodiment of the disclosure, the first feeding unit 311 and the second feeding unit 312 may be coupled to the CPR improvement antenna 320 to directly supply a signal.

A co-pol component of the first polarization may be generated on a first face 331 and a third face 333 by means of the signal. The co-pol component is orthogonal to the first face 331 and the third face 333, while the cross-pol component may be reduced. The CPR improvement antenna 320 means an antenna configured such that the cross-pol component is constructed to be smaller in a radiation region, as described below. The cross-pol component is decreased along with an increase in an area of first face 331 and third face 333 in which the co-pol component is generated, thereby improving CPR performance. According to an embodiment of the disclosure, the first polarization and the second polarization may be orthogonal to each other. For example, the first polarization is −45° polarization (in a (−)45° direction on a xy plane), and the second polarization is +45° polarization (in a (+)45° direction on the xy plane).

A shape of the CPR improvement antenna 320 may include a structure in which corners of a patch antenna 310 having a square shape are cut. Since each corner of the square is cut, an octagonal shape is formed. In order to address an issue in which a CPR deteriorates as a distance of elements is decreased, the shape of the CPR improvement antenna 320 may include a structure in which each vertex is symmetrically cut or folded down in the square-shaped patch antenna 310.

Each of the four vertices of the square may be a radiation source region of the patch antenna 310. A co-pol component for each polarization is applied to the vertex. For example, when a signal of +45° polarization is applied, a vertex of a first quadrant and a vertex of a third quadrant of the xy plane (assuming that a center of a patch is an origin) correspond to the radiation source region. In addition, for example, when a signal of −45° polarization is applied, a vertex of a second quadrant and a vertex of a fourth quadrant of the xy plane correspond to the radiation source region.

In a field generated by the first feeding unit, a vector component horizontal to a conductive face (e.g., the first face 331 and the third face 333), that is, the cross-pol component of the first polarization, is not generated. With the same principle, in a signal of the second polarization, a vector component horizontal to a conductive face (e.g., the second face 332 and the fourth face 334), that is, the cross-pol component of the signal of the second polarization, is not generated. As such, CPR performance may be improved by reducing a size of the cross-pol component. In order to form such a radiation source region, the CPR improvement antenna 320 of FIG. 3 has a shape in which the CPR improvement is maximized by cutting or folding a corner portion. A specific principle for this is described with reference to FIG. 4A.

Although it is illustrated as being cut in FIG. 3, not only cutting but also a structure of being folded down or folded up with respect to a cut face may be understood as an embodiment of the disclosure.

Although the shape of CPR improvement antenna 320 has been described in FIG. 3 based on the patch antenna 310, this is only for comparison with the patch antenna 310 of the related art in order to explain CPR improvement of the disclosure, and it is not construed as limiting characteristics of the shape to be proposed in an embodiment of the disclosure or limiting a manufacturing method.

Figure 4A:
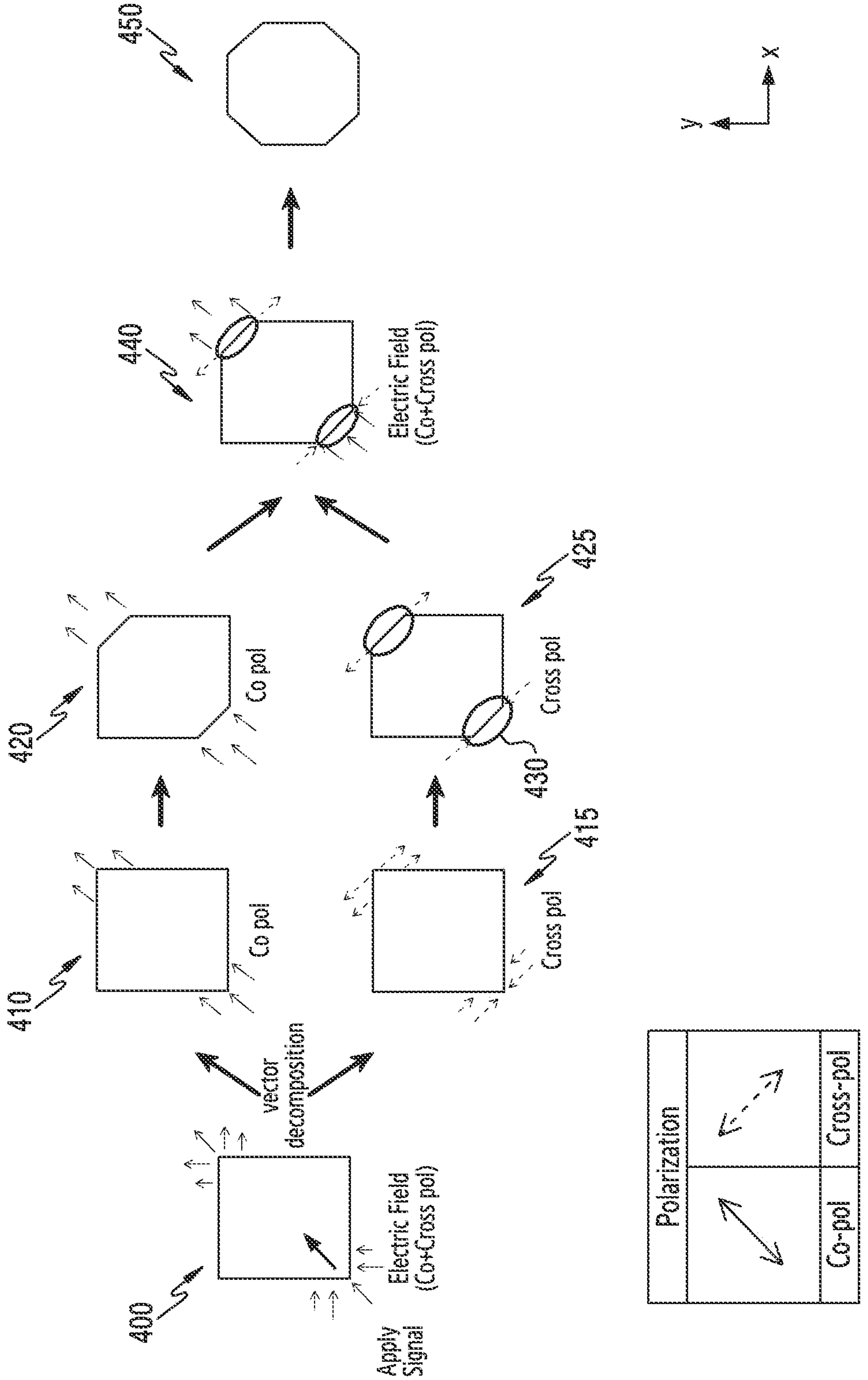
FIG. 4A illustrates a design principle of an antenna structure according to an embodiment of the disclosure.

FIG. 4A illustrates a design principle of an antenna structure according to an embodiment of the disclosure. The design principle is to reduce a cross-pol component by reducing a region in which a cross-pol is generated in a radiation source region, thereby providing CPR improvement. In addition, this may lead to a decrease in asymmetry of an electric field distribution. Hereinafter, each operation described through FIG. 4A is an operation for explaining the principle of CPR improvement, and is not used as limiting an embodiment by being interpreted as a sequence of operations or algorithms of a specific method.

Various embodiments of the disclosure propose an antenna shape having a radiation source region under a condition that only a co-pol component exists in order to obtain an optimal CPR. For example, a face (or a corner) orthogonal to the co-pol component is in contact. When the radiation source region is located at a corner orthogonal to the co-pol component, a cross-pol component does not exist, and only the co-pol component exists. The cross-pol component is more generated when the corner of the radiation source region is not orthogonal to the co-pol component. A principle for this will be described through a vector decomposition method of FIG. 4A.

Referring to FIG. 4A, in operation 400, a signal may be applied to a square patch in +45° direction. Each arrow represents a co-pol component and a cross-pol component in an electric field. The radiation source region is formed about vertices of first and third quadrants. The electric field to be generated needs to be identified by the co-pol component in operation 410 and the cross-pol component in operation 415 because a vertical vector component of the signal is generated at a conductive boundary face according to an electromagnetic boundary condition. For this, vector decomposition may be performed on the signal.

In operation 410, after the vector decomposition, a co-pol component of an electric field of +45° polarization (an electric field generated due to radiation of a signal corresponding to +45° polarization) exists only in the +45° direction. In operation 415, after the vector decomposition, the cross-pol component of the electric field of +45° polarization exists only in the −45° direction. Both corners centering on a vertex of a first quadrant and a vertex of a third quadrant are not-perpendicular to the co-pol component. Since the electric field has only a component perpendicular to a conductive plane, the electric field is formed in a horizontal/vertical direction at this vertical/horizontal corner. If the horizontal/vertical electric field is analyzed by dividing it into the co-pol component and the cross-pol component, the co-pol component and the cross-pol component exist simultaneously at both corners. For example, it is not possible to obtain the most optimal CPR.

In order to maximize the co-pol component perpendicular to a side face of a patch in which a polarization is formed, the side face shall be perpendicular to a polarization direction. When the corner of the radiation source region is changed to be perpendicular to the co-pol component, the cross-pol component does not exist because only an electric field component perpendicular to the conductive plane exists, and a CPR, which is a ratio of the co-pol component and the cross-pol component, is improved. Therefore, as in operation 420, an antenna shape having a boundary face perpendicular to the +45° polarization direction is required. With the same principle, in operation 425, an antenna shape having a boundary face horizontal to the −45° polarization direction of the cross-pol component is required. In operation 440, it is proposed to design an antenna shape for maximizing CPR performance of a signal having +45° polarization, by considering both the requirement of the co-pol component and the requirement of the cross-pol component. Among the square-shaped patch antennas, in a corner corresponding to a first quadrant and a corner corresponding to a third quadrant, that is, in the radiation source region 430, the antenna is constructed to have a boundary face perpendicular to a polarization direction. Since both the two polarizations are used in actual signal radiation in a dual-polarized antenna, the antenna may be constructed such that all four corners have a boundary face perpendicular to an applied signal as in operation 450.

Although a 2-dimensional vector is shown in FIG. 4A to explain the shape of the radiation source region and the principle of CPR improvement, an actual antenna and a signal to be applied may be configured in a 3-dimension. Even in this case, since only a vector component perpendicular to a boundary face is generated in a 3-dimensional electric field, the principle described in FIG. 3 may be applied in the same or similar manner.

When considering the principle described with reference to FIG. 4A, an antenna shape according to embodiments of the disclosure may be defined by deployment of a corresponding face (i.e., a side face of a radiation patch corresponding to a polarization direction) on which a polarization is generated. Herein, the corresponding face may mean a face on which the polarization is generated. For example, in FIG. 3, the corresponding face on which a first polarization (a polarization caused by the first feeding line 311) may be the first face 331 and the third face 333. In addition, for example, in case of a square patch, all of adjacent faces of a corner may correspond to the corresponding face.

According to various embodiments of the disclosure, the shape of the antenna for CPR improvement may include a shape in which an angle (hereinafter, a co-pol angle) formed by a co-pol direction of a polarization and a corresponding face is greater than an angle (hereinafter, a cross-pol angle) formed by a cross-pol direction of the polarization and the corresponding face, with respect to each of at least one corresponding face in which the polarization is generated. Herein, the angle formed by a line and a plane means an angle equal to or smaller than two angles (i.e., an acute angle or a right angle). For example, the antenna may be constructed such that the first angle formed in each of the at least one corresponding face by the cross-pol for the direction of the first polarization with respect to the corresponding face is less than the second angle formed by the co-pol for the direction of the first polarization with respect to the corresponding face. Herein, the first angle may be an acute angle or 0 degrees, and the second angle may be an acute angle or a right angle.

The existing rectangular patch is considered. Co-pol and cross-pol angles of an electric field are 45 degrees. Therefore, since both a co-pol component and a cross-pol component exist, CPR performance is degraded. When a rectangular patch is disposed in an inclined manner, a co-pol angle is greater than a cross-pol angle on one corresponding face on which a polarization is generated, whereas the cross-pol angle is greater than the co-pol angle in another corresponding face on which a polarization is generated. Therefore, since the cross-pol component still exists, CPR performance is not improved. Accordingly, it is necessary to newly construct a corresponding face so that the co-pol angle is greater than the cross-pol angle in each of all the corresponding face(s) of the electric field. Hereinafter, in the disclosure, such a corresponding face is referred to as a vertical-corresponding face. In the vertical-corresponding face, an angle is not necessarily formed only perpendicular to the direction of the polarization. For example, the term 'vertical-corresponding face' may be used as a concept including not only a face formed vertically to the polarization direction in a narrow sense but also a quasi-vertical corresponding face of which a co-pol component of a polarization generated on a corresponding face is larger than a cross-pol component of a polarization generated on the corresponding face.

Figure 4B:
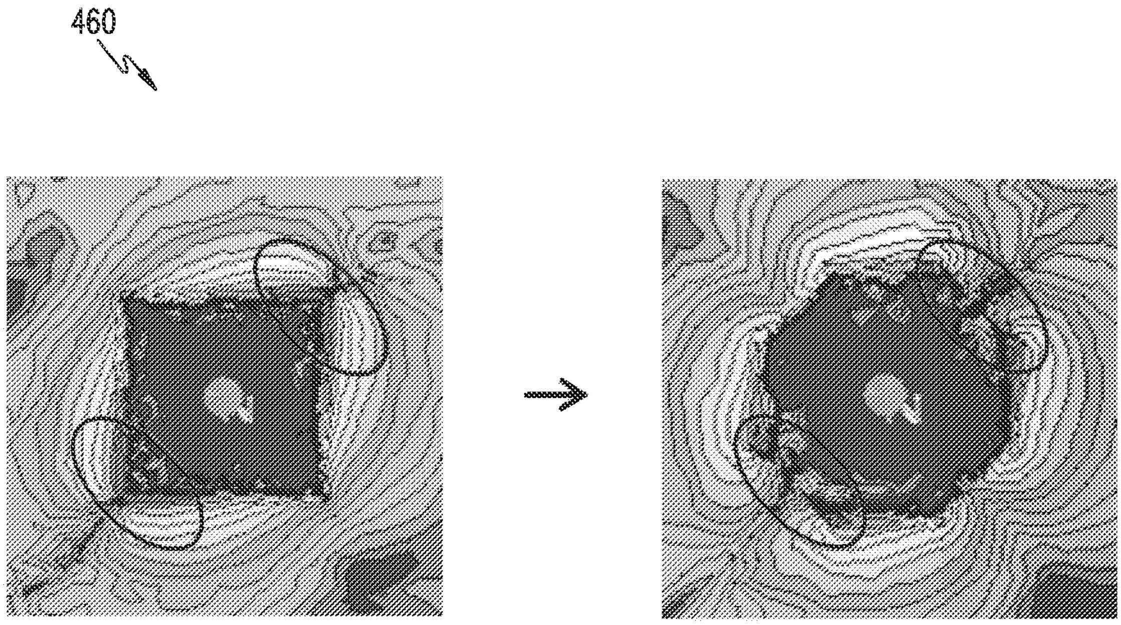
FIG. 4B illustrates a cross-pol field of a radiation element of an antenna structure according to an embodiment of the disclosure.

FIG. 4B illustrates an CPR effect of a radiation element of an antenna structure according to an embodiment of the disclosure. The CPR effect may be identified through a size of a cross-pol component of an antenna.

Referring to FIG. 4B, an electric field 460 represents a cross-pol component of each antenna. A left portion of the electric field 460 represents an electric field of a square patch antenna. A right portion of the electric field 460 represents an electric field of an antenna (e.g., the CPR enhancement antenna 310 of FIG. 3, the antenna of operation 450 of FIG. 4A) having a shape of a vertical-corresponding face. A cross-pol component in a radiation source region is compared. A cross-pol component is high at a corner of the square patch. However, a cross-pol component in two symmetrical sides of a shape of a vertical-corresponding face, i.e., an octagon, is less than that of the square patch. For example, since a boundary face perpendicular to the polarization direction is disposed in the radiation source region, the cross-pol component is decreased. A CPR may be improved due to the low cross-pol component.

Figure 5:
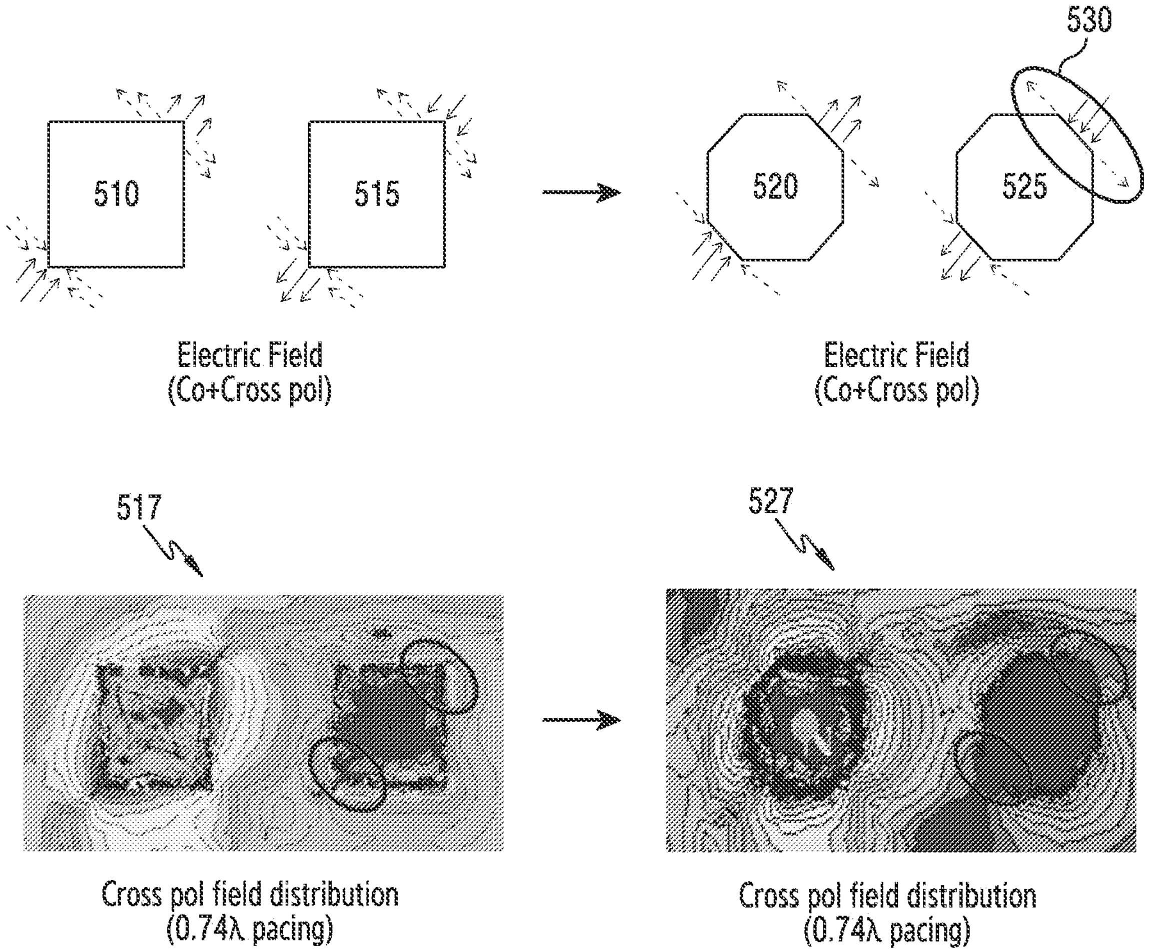
FIG. 5 illustrates a principle of reducing a cross-pol field of an antenna structure and a proximity element according to an embodiment of the disclosure.

FIG. 5 illustrates a principle of reducing a cross-pol field of an antenna structure and a proximity element according to an embodiment of the disclosure. A CPR effect of the proximity element may be identified with an electric field of the cross-pol component.

Referring to FIG. 5, an antenna 510 and an antenna 515 may be disposed to be adjacent on an antenna array. A signal is applied to the antenna 510. The applied signal is radiated through the antenna 510, and a radiated electric field is excited to the antenna 515, which causes re-radiation. In this case, the cross-pol component of the electric field excited to the proximity element may act as degradation of CPR performance of the entire antenna (e.g., an array antenna). An electric field 517 represents a cross-pol field of the antenna 510 and the antenna 515. Due to the antenna 510 which is a radiation element, the cross-pol component of the antenna 515 which is a proximity element is identified at an edge of a corner. This performance degradation is more significant in an array antenna in which antennas are densely located as mentioned in FIG. 2D. When a distance between antenna elements gets closer in the array antenna, the radiation element and the proximity element get closer so that the cross-pol component is excited to the proximity element, and the excited component is re-radiated to degrade entire CPR performance of the antenna array. Since not only a CPR of the radiation element but also a CPR of the proximity element shall be considered in the entire CPR performance, there is a need to improve CPR performance of the proximity element.

According to the CPR improvement principle described in FIG. 4A, when an electric field of a cross-pol component of a single element is reduced, an electric field of a cross-pol component of a proximity element in which interference occurs may also be reduced. An antenna 520 and an antenna 525 may be disposed to be adjacent on an antenna array. A signal is applied to the antenna 520. The applied signal is radiated through the antenna 520, and a radiated electric field 530 is excited to the antenna 525, which causes re-radiation of the antenna 525. In this case, since the cross-pol component of the electric field excited to the proximity element is parallel to a boundary face, an electric field of a cross-pol is reduced. An electric field 527 represents a cross-pol field distribution of the antenna 520 and the antenna 525. Compared with the electric field 517, it is shown that the cross-pol component of the antenna 525, which is a proximity element, is relatively weak at a corner edge.

Even if the cross-poll component is excited due to the reduction of a distance between elements, since a region in which the cross-pol component is concentrated in the proximity element is fundamentally removed, re-radiation of the cross-pol component may be reduced. For example, although the cross-pol component is increased along with the reduction of the distance, a CPR of the entire array antenna may be improved to the maximum extent through an antenna shape (e.g., a vertical-boundary face shape) (e.g., the CPR improvement antenna 310 of FIG. 3, the antenna of operation 450 of FIG. 4A) which minimizes the cross-pol component.

Figure 6A:
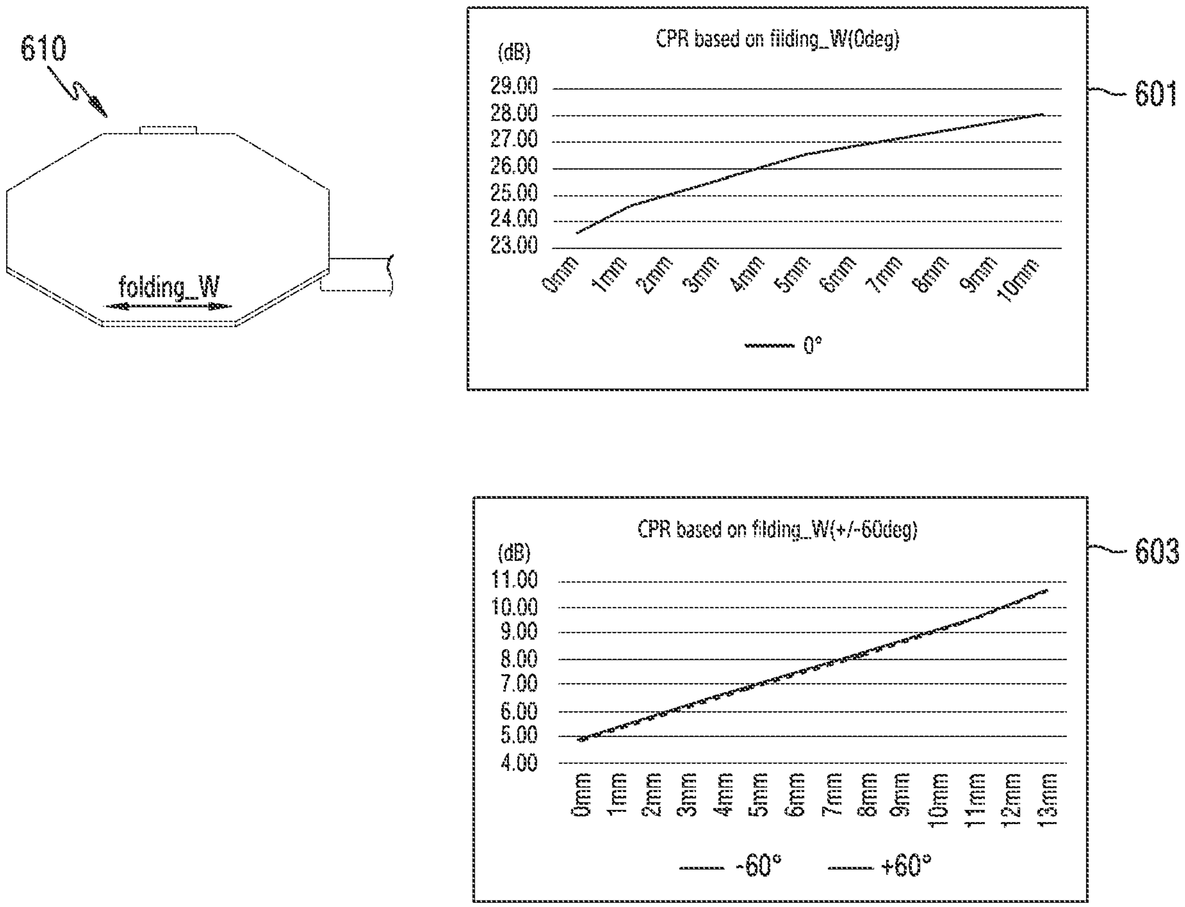
FIG. 6A illustrates CPR performance depending on a width of a radiation element of an antenna structure according to an embodiment of the disclosure.

FIG. 6A illustrates CPR performance depending on a width of a radiation element of an antenna structure according to an embodiment of the disclosure. Herein, the width corresponds to a length of a vertical-corresponding face of a radiation element. The vertical-corresponding face means a corresponding face on which a polarization component of an applied signal is generated. For example, in case of FIG. 3, a vertical-corresponding face of a first polarization may be the first face 331 and the third face 333. In a shape according to embodiments of the disclosure, a corresponding face is disposed such that a co-pol component of an electric field to be generated is larger than a cross-pol component. The face disposed in this manner may be referred to as a 'vertical-corresponding face'.

Referring to FIG. 6A, an antenna 610 may include an octagonal patch of a shape in which each corner is folded (folded portions are not shown) in a rectangular patch. A width of a face perpendicular and symmetrical to a signal applied to a feeding line is denoted by 'folding_W'. A graph 601 shows CPR performance depending on a width in a boresight direction (0°). A horizontal axis represents a length of the width, and a vertical axis represents the CPR. A graph 603 shows CPR performance depending on a width in sector boundaries (−60°, +60°). The horizontal axis represents a length of the width, and the vertical axis represents the CPR.

It is shown that the CPR performance is improved in proportion to an increase in the width. This is because the greater the area of the vertical-corresponding face, the more the vector components in the vertical direction (i.e., a polarization direction), but the less the vector components of the horizontal direction (i.e., a direction orthogonal to the polarization). The CPR performance is improved in proportion to a width which is cut with respect to the existing shape (e.g., the square patch).

Figure 6B:
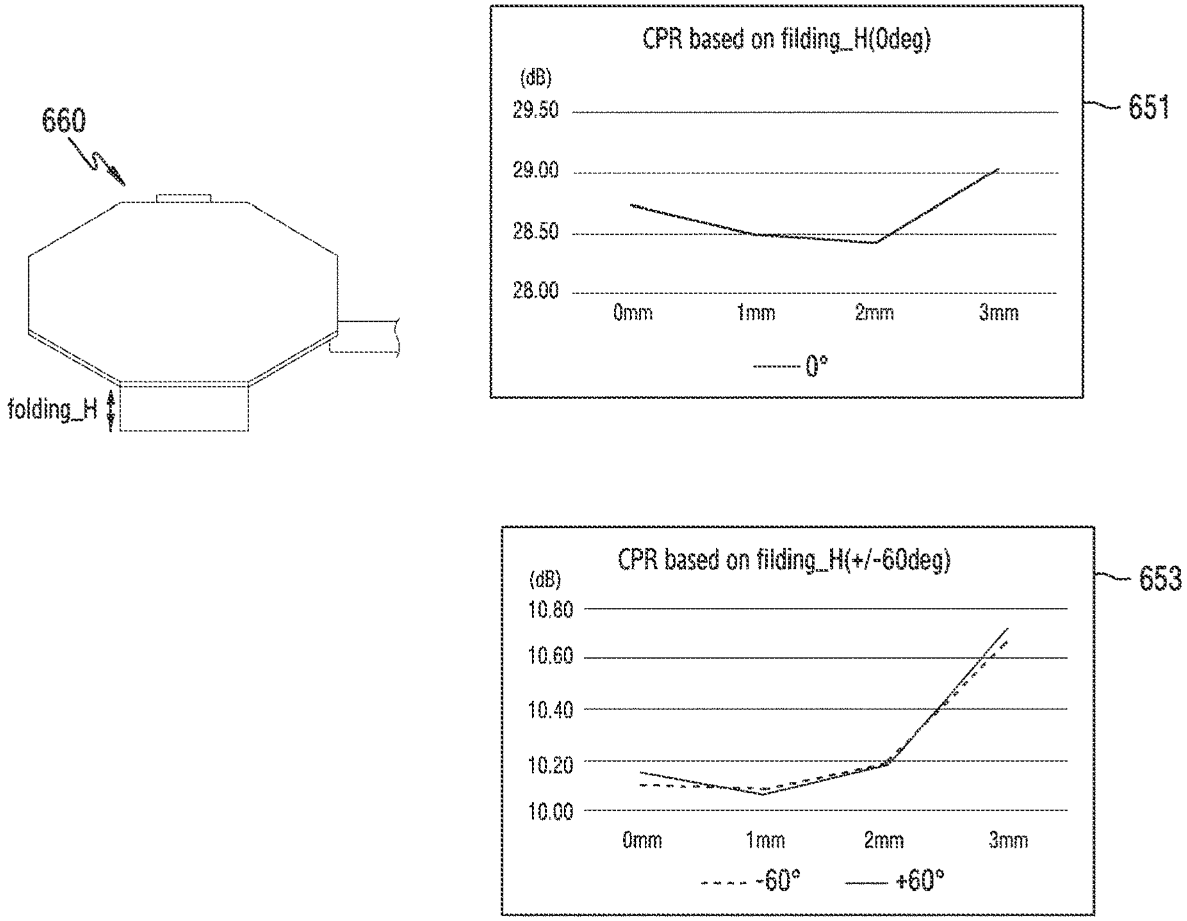
FIG. 6B illustrates CPR performance depending on a height of a construction attached to a radiation element of an antenna structure according to an embodiment of the disclosure.

FIG. 6B illustrates CPR performance depending on a height of a construction attached to a radiation element of an antenna structure according to an embodiment of the disclosure. The height of the construction means a length of a vertical component of a construction additionally added to the radiation element.

Referring to FIG. 6B, an antenna 660 may include an octagonal patch of a shape in which each corner is folded (folded portions are not shown) in a rectangular patch. In addition thereto, an additional construction having a specific height may be added to the octagonal patch. Herein, the height of the construction is denoted by 'folding_H'. A graph 651 shows CPR performance depending on a width in a boresight direction (0°). A horizontal axis represents the height, and a vertical axis represents the CPR. A graph 653 shows CPR performance depending on a width in sector boundaries (−60°, +60°). The horizontal axis represents a length of the width, and the vertical axis represents the CPR.

It may be shown that the improved CPR is maintained even if the construction is added to a cut portion. In addition, an increase in a length of a corner perpendicular to a co-pol component in a basic structure (e.g., a square patch) results in a decrease in a cross-pol component in a radiation source region, thereby improving the CPR in proportion thereto. In addition, when the radiation source region defined in a 2-dimension is expanded to a 3-dimensional space including a height vector of an antenna, the radiation source region of the related art is expanded to a region having a height. For example, when a basic shape of an element to which the proposed structure is applied is maintained, it is possible to add the construction under a condition that only the co-pol component exists in the expanded radiation source region. For example, when a construction is added vertically to a lower end of a modified corner with respect to the square patch antenna (e.g., in a shape in which the patch is folded down), the construction may provide an effect of cancelling an electric field of a cross-pol component generated at the lower end of the patch. A decrease in the cross-pol component may result in improvement of CPR performance.

The structure proposed representatively with reference to FIGS. 3 and 4A has a symmetric structure as a dual polarization. However, a principle of CPR improvement to be explained through embodiments of the disclosure is not limited to the dual polarization or the symmetric structure. Hereinafter, it is described that various modifications are possible in implementation with reference to FIGS. 7A, 7B, 7C, 7D, 7E, 7F, 7G, and 7H. For example, it is applicable even if the existing antenna patch does not have a rectangular shape (e.g., a circle), and a cross-pol component may be removed only in some radiation source regions by folding only some corners.

FIGS. 7A, 7B, 7C, 7D, 7E, 7F, 7G, and 7H illustrate a radiation element of an antenna structure according to various embodiments of the disclosure.

Figure 7A:
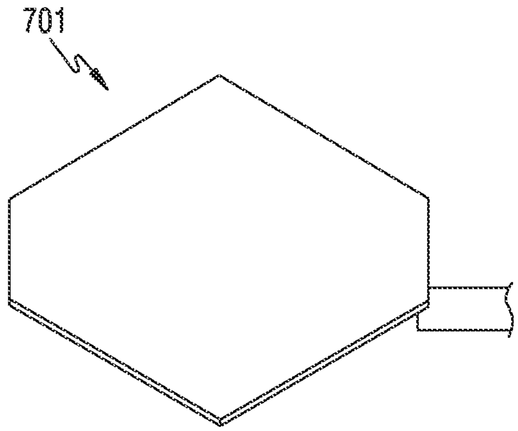
FIGS. 7A, 7B, 7C, 7D, 7E, 7F, 7G, and 7H illustrate a radiation element of an antenna structure according to various embodiments of the disclosure.

Referring to FIG. 7A, a first antenna 701 may include a shape for a single polarization. For example, the first antenna 701 may include a shape in which only corners corresponding to one direction are folded, rather than corner portions are symmetrically folded in each polarization direction for a double polarization. Meanwhile, although not shown in FIG. 7A, even if it is a dual-polarized antenna, the first antenna 701 may be used due to a structural limitation, a production constraint, or the like.

Figure 7B:
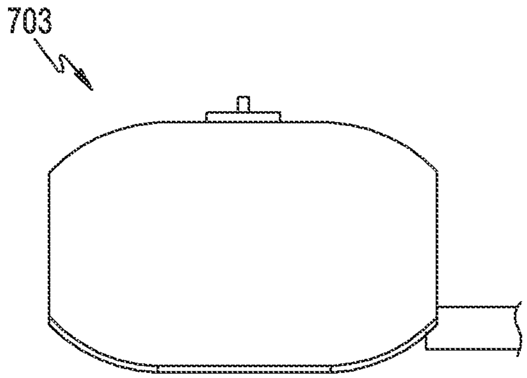

Referring to FIG. 7B, a second antenna 703 may include a shape including a vertical-corresponding face, based on a circular patch. It is proposed in FIGS. 3 and 4A that a corresponding face perpendicular to a polarization is formed by folding or cutting a corner of a rectangular patch. However, without being limited to the corner, a boundary face perpendicular to a polarization may be formed by folding or cutting a specific range of a point (or a 3-dimensional coordinate) at which a polarization is generated in the circular patch. Although a circular shape is taken for example in the description of FIG. 7B, in addition to the circular shape, as long as the figure is another polygon such as a pentagon or another figure consisting of closed curves, the antenna shape may be configured to include a corresponding face perpendicular to a polarization direction, based on a location at which the polarization is generated.

Figure 7C:
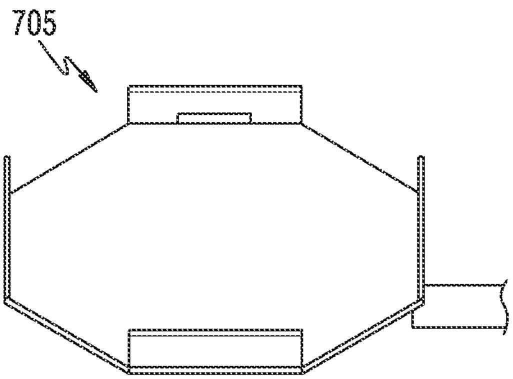

Referring to FIG. 7C, a third antenna 705 may include a shape in which a vertical-corresponding face is formed and an additional construction is folded up. When it is constructed such that the additional construction is disposed upward, a cross-pol component delivered above a patch may be reduced. Accordingly, CPR performance may be improved. Although the additional construction is exemplified as a square pillar, a shape of the construction is not limited thereto. Various constructions may be attached facing upward according to a direction in which the patch antenna is folded and a direction in which the patch antenna is cut.

Figure 7D:
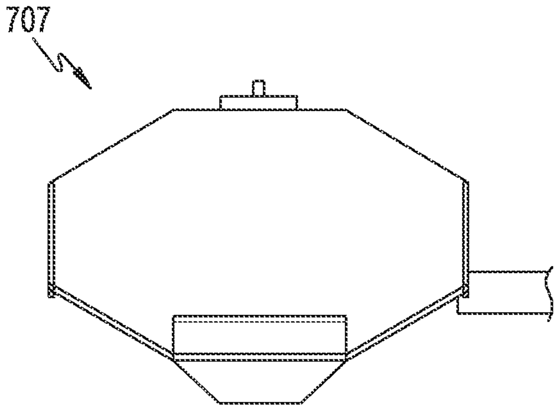

Referring to FIG. 7D, a fourth antenna 707 may include a shape in which a vertical-corresponding face is formed and an additional construction is folded down. When it is constructed such that the additional construction is disposed downward, a cross-pol component delivered below a patch may be reduced. Accordingly, CPR performance may be improved. Although the additional construction is exemplified as a square pillar, a shape of the construction is not limited thereto. Various constructions may be attached facing downward according to a direction in which the patch antenna is folded and a direction in which the patch antenna is cut.

Figure 7E:
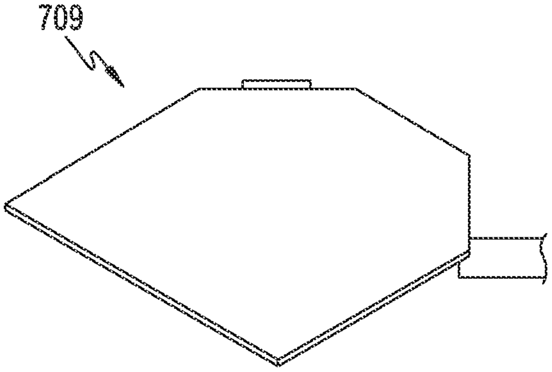

Referring to FIG. 7E, a fifth antenna 709 may include a shape of an asymmetric vertical-corresponding face. For example, instead of forming the vertical-corresponding face on both sides corresponding to a polarization direction, the vertical-corresponding face may be formed only on one face. According to an embodiment of the disclosure, when performance degradation caused by the cross-pol component is slightly insignificant at a specific location in an array antenna, the fifth antenna 709 may be disposed at the specific location. Although the vertical-corresponding face is formed only in a direction in which a signal is applied in FIG. 7E, it may also be understood as an embodiment of the disclosure when the vertical-corresponding face is formed at an opposite corner of the direction in which the signal is applied.

Figure 7F:
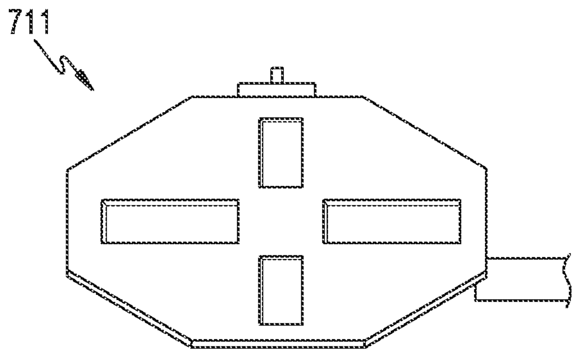

Referring to FIG. 7F, a sixth antenna 711 may include a shape in which some faces of a patch are recessed. In this case, a vertical-corresponding face may be formed in a radiation source region which is each corner of a rectangular patch. CPR performance may be maximized through the vertical-corresponding face together with a puncturing region. According to an embodiment of the disclosure, the recessed face may be bent to be vertically disposed on a substrate (not shown), and may be used as a support pillar. In this case, for example, the support pillar may perform only a role of the support pillar itself or may perform a role of a feeding line as a conductor.

Figure 7G:
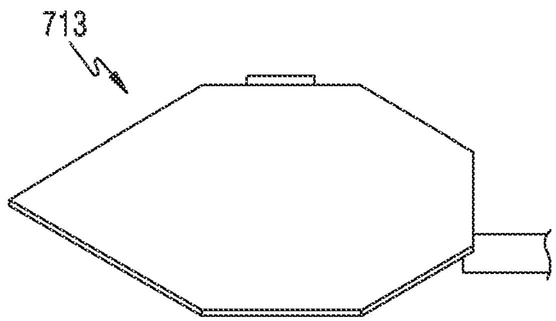

Referring to FIG. 7G, a seventh antenna 713 may include another shape of an asymmetric vertical-corresponding face. For example, instead of forming the vertical-corresponding face on both sides corresponding to a polarization direction, the vertical-corresponding face may not be formed on one face.

Figure 7H:
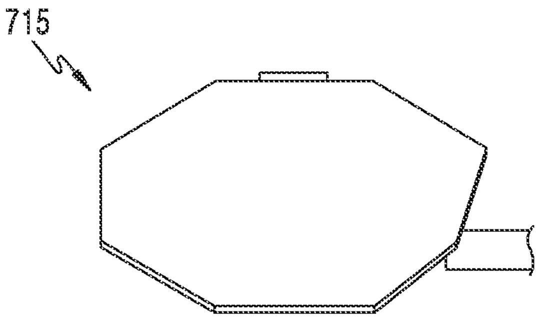

Referring to FIG. 7H, an eighth antenna 715 may include a quasi-vertical corresponding face. Even if a boundary face entirely perpendicular to a polarization is not formed, if a co-pol component, generated in a corresponding face, in a polarization direction is N times greater than a cross-pol component (herein, N is a real number greater than 1), the corresponding boundary face may be referred to as a quasi-vertical corresponding face.

Various modifications of the antenna elements have been described with reference to FIGS. 7A, 7B, 7C, 7D, 7E, 7F, 7G, and 7H. However, FIGS. 7A, 7B, 7C, 7D, 7E, 7F, 7G, and 7H are only for explaining that various antenna elements are configured by applying the CPR improvement principle of the disclosure, and embodiments of the disclosure are not limited to the illustrated antenna elements. In an electric field formed on a corresponding face, a ratio of a co-pol component perpendicular to a corresponding face is greater than a ratio of a cross-pol component perpendicular to the corresponding face.

Figure 8A:
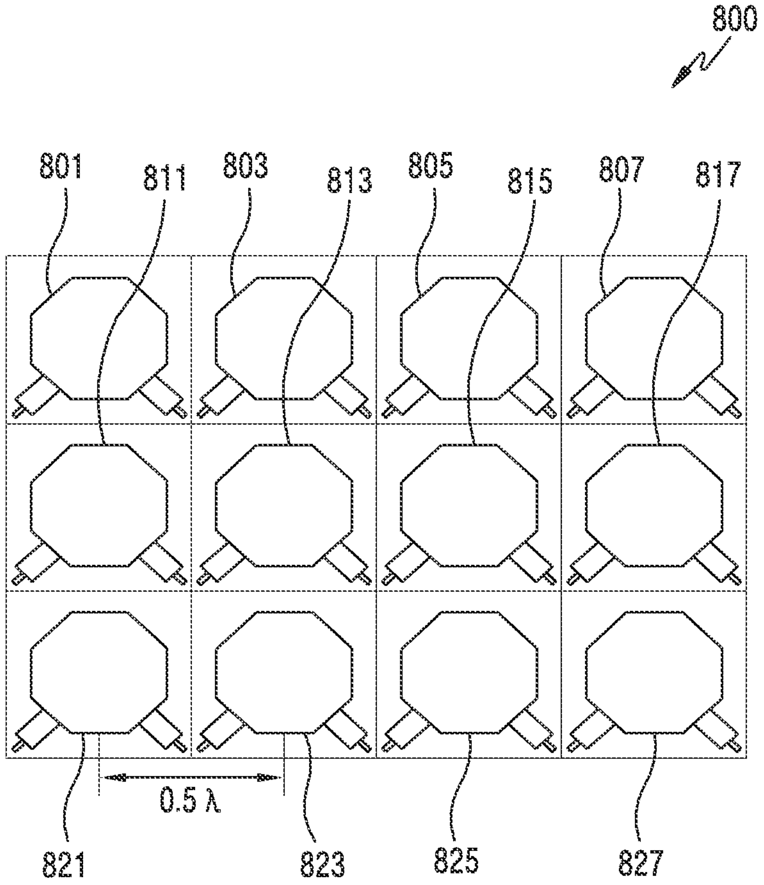
FIG. 8A illustrates an antenna array including an antenna structure according to an embodiment of the disclosure.

FIG. 8A illustrates an antenna array including an antenna structure according to an embodiment of the disclosure.

Referring to FIG. 8A, a 3×4 antenna array 800 is exemplified. Antennas are disposed such that a distance between the antennas is 0.5λ. The antenna array 800 may include a $1^{st}$ antenna element 801, a $2^{nd}$ antenna element 803, a $3^{rd}$ antenna element 805, a $4^{th}$ antenna element 807, a $5^{th}$ antenna element 809, a $6^{th}$ antenna element 811, a $7^{th}$ antenna element 815, an $8^{th}$ antenna element 817, a $9^{th}$ antenna element 821, a $10^{th}$ antenna element 823, a $11^{th}$ antenna element 825, and a $12^{th}$ antenna element 827. Herein, respective antenna elements may correspond to the antennas described with reference to FIGS. 2A, 2B, 2C, 2D, 2E, 2F, 3, 4A, 4B, 5, 6A, 6B, 7A, 7B, 7C, 7D, 7E, 7F, 7G, and 7H.

Figure 8B:
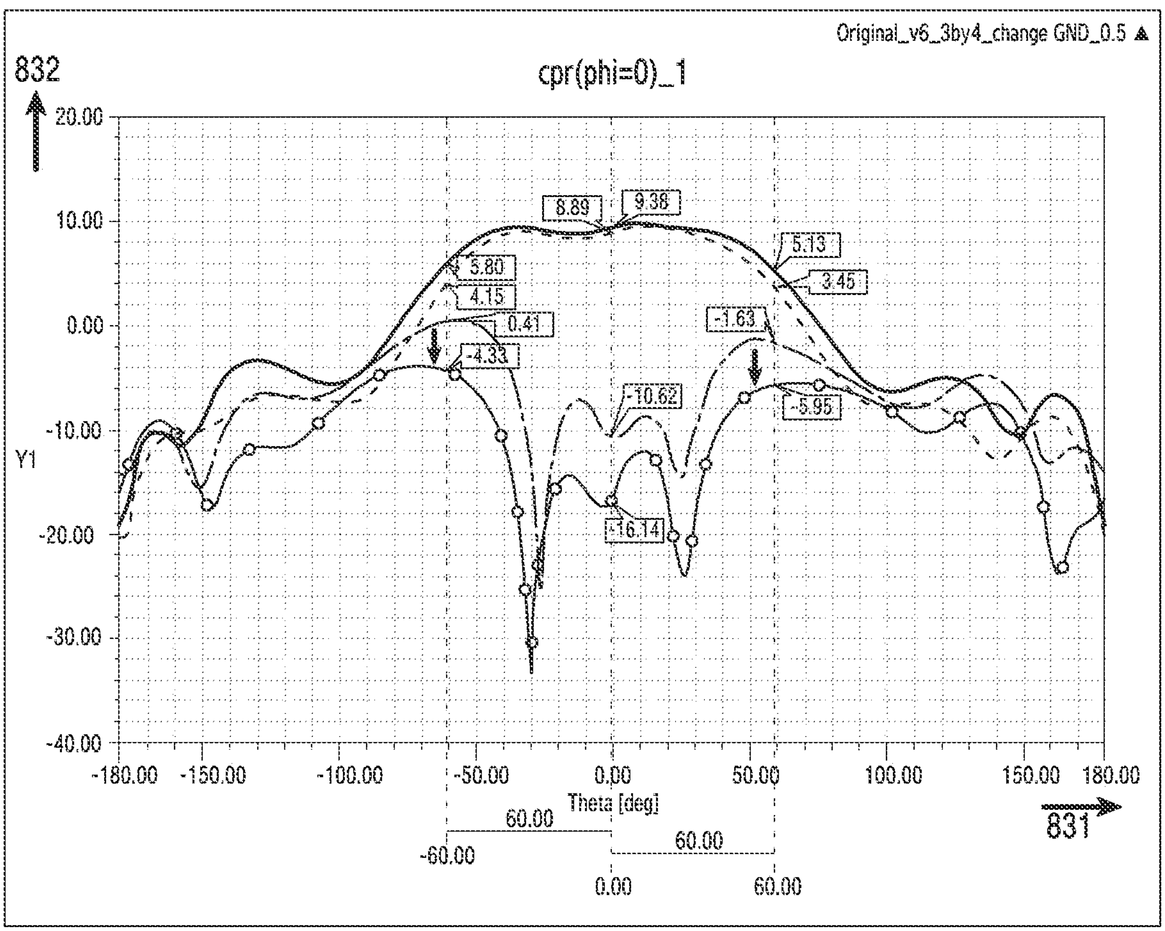
FIG. 8B illustrates an antenna radiation pattern for indicating improvement of CPR performance according to an embodiment of the disclosure.
Figure 8C:
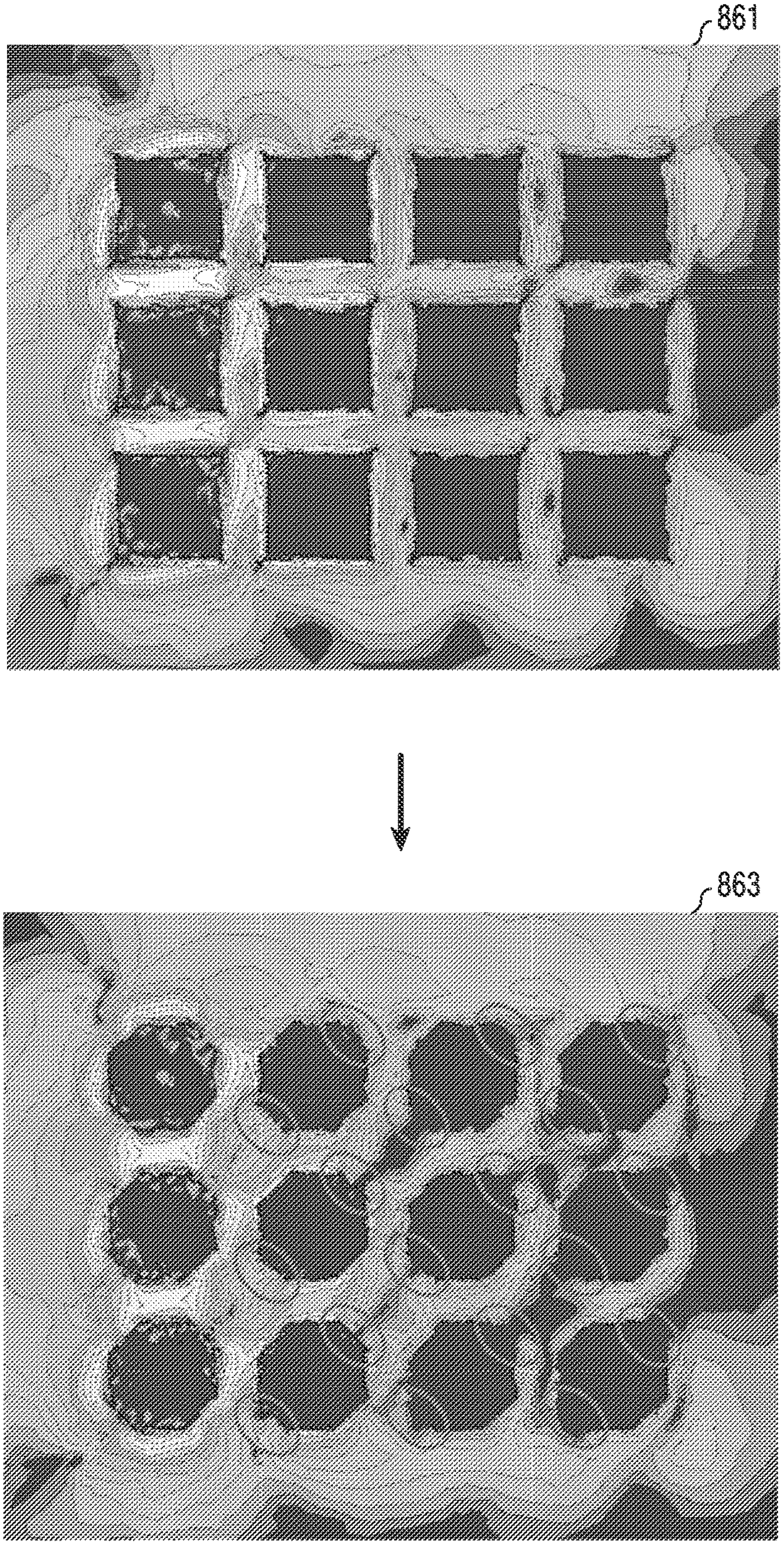
FIG. 8C illustrates a cross-pol field for indicating a CPR effect of a proximity element in an array antenna including an antenna structure according to an embodiment of the disclosure.

The antenna array 800 is taken for example in the description of CPR performance of FIGS. 8B and 8C. However, the antenna array 800 shown in FIG. 8A is not to be construed as limiting the embodiment of the antenna array of the disclosure. According to an embodiment of the disclosure, antenna elements in the antenna array may have different shapes. A CPR effect on a proximity element may vary depending on a location in the antenna array. Accordingly, the antenna elements having different shapes may be used depending on the location in the antenna array. For example, the antenna 713 of FIG. 7G may be disposed at a corner edge of the array antenna, and the antenna 701 of FIG. 7A may be disposed in the middle of the array antenna.

FIG. 8B illustrates an antenna radiation pattern for indicating CPR performance of an array antenna including an antenna structure according to an embodiment of the disclosure.

Referring to FIG. 8B, a graph 830 shows CPR performance depending on a distance between antennas. A horizontal axis 831 represents an angle of a radiation pattern, and a vertical axis 832 represents a size of the co-pol component 251 or cross-pol component. Performance may be exemplified as follows, based on the antenna array 800 of FIG. 8A, i.e., a 3×4 array.

TABLE 2

| | | | min | max | avg |
|---|---|---|---|---|---|
| basic structure (unfolded) | CPR | −60° | 3.89 | 6.87 | 4.91 |
| | | 0° | 17.88 | 30.85 | 23.92 |
| | | 60° | 3.80 | 6.74 | 4.82 |
| proposed structure (folded) | CPR | −60° | 8.98 | 12.88 | 10.75 |
| | | 0° | 23.48 | 34.46 | 28.94 |
| | | 60° | 8.82 | 12.90 | 10.71 |
| improvement | CPR | −60° | 5.09 | 6.01 | 5.85 |
| | | 0° | 5.61 | 3.61 | 5.02 |
| | | 60° | 5.02 | 6.16 | 5.90 |

Table 2 shows that, in the 3×4 array antenna, a CPR component of the array antenna is identified while applying a signal by one column 'min' means a lowest value among per-column results, and 'max' means a highest value among per-column results. 'avg' means an average of per-column results. It is shown that the overall CPR performance is improved within a sector range. This is because a boundary face is formed such that a vertical vector component of a polarization increases and a horizontal vector component (a cross-pol component) decreases, by folding a patch corner portion.

FIG. 8C illustrates a cross-pol field for indicating a CPR effect of a proximity element in an array antenna including an antenna structure according to an embodiment of the disclosure. The CPR effect is expressed as an electric field of a cross-pol component. The higher the cross-pol component, the poorer the CPR performance. The lower the cross-pol component, the higher the CPR performance.

Referring to FIG. 8C, an electric field 861 represents an electric field of an antenna array including a rectangular patch antenna. An electric field 863 represents an electric field of an antenna array including an antenna having a shape of a vertical-corresponding face, i.e., the proposed structure according to embodiments of the disclosure. When a signal of +45° polarization is applied, it is shown that a cross-pol component is decreased in the entire antenna array.

Figure 8D:
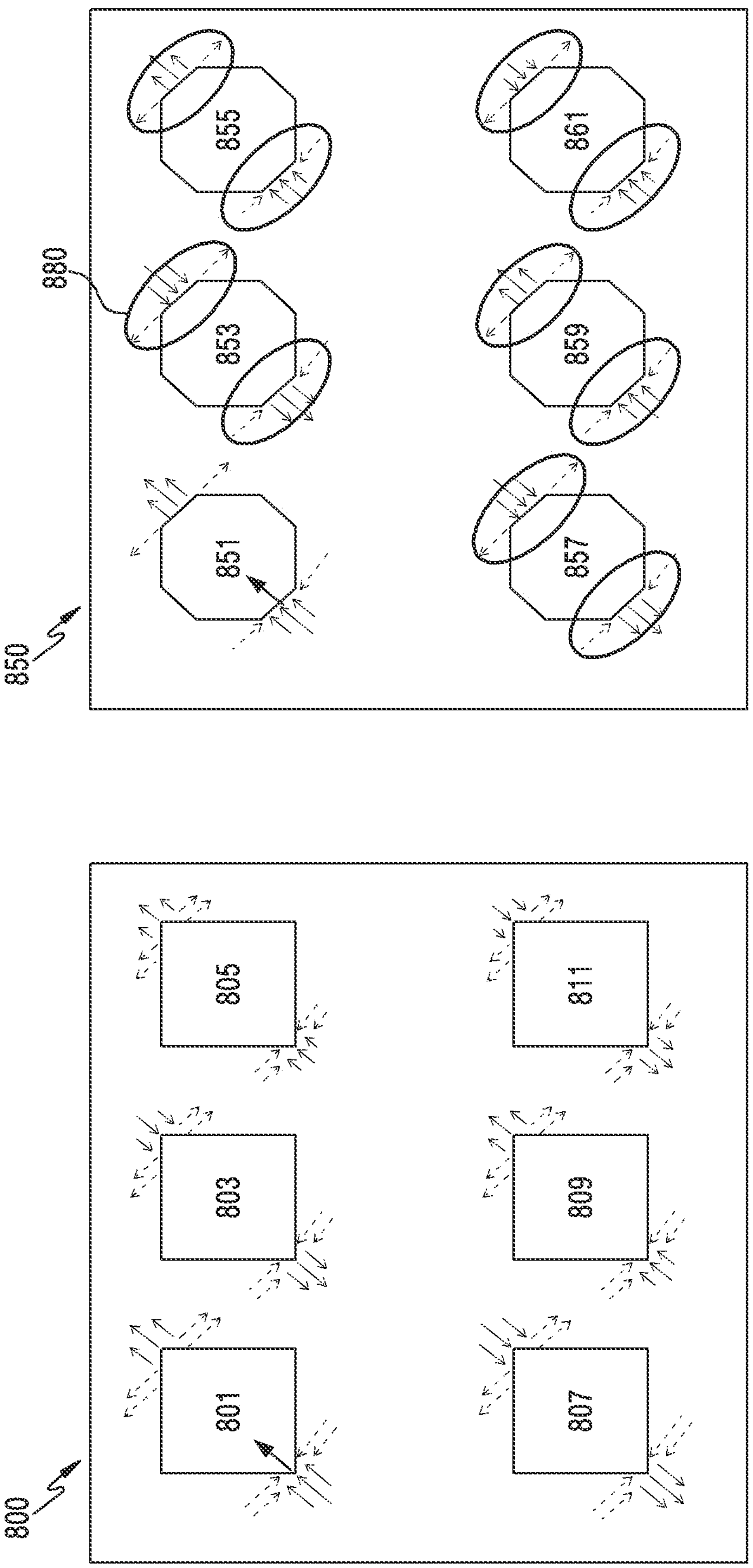
FIG. 8D illustrates a principle of CPR improvement of a proximity element according to an embodiment of the disclosure.

FIG. 8D illustrates a principle of CPR improvement of a proximity element according to an embodiment of the disclosure. A 2×3 array antenna is exemplified as an antenna.

Referring to FIG. 8D, the antenna array 800 may include a first antenna element 801, a second antenna element 803, a third antenna element 805, a fourth antenna element 807, a fifth antenna element 809, and a sixth antenna element 811. Each antenna element of the antenna array 800 includes a shape of a rectangular patch. In this case, part of an electric field of the first antenna element 801 which is a radiation element may be excited to the second antenna element 803 which is a proximity element. In this case, regarding an angle formed by a corresponding face and a polarization direction based on an electric field excited in a radiation source region of the rectangular patch, both a cross-pol component and a co-pol component form an angle of 45 degrees. Therefore, since a vertical vector of a signal is not smoothly formed and a horizontal component also remains, there is an overall increase in the cross-pol component increases. The increased cross-pol causes overall CPR performance degradation.

An antenna array 850 may include a first antenna element 851, a second antenna element 853, a third antenna element 855, a fourth antenna element 857, a fifth antenna element 859, and a sixth antenna element 861. Each antenna element of the antenna array 800 includes a shape (e.g., two-dimensional octagonal patch or a three-dimensional vertical-corresponding face shape) in which a corner portion is cut in a rectangular patch. In this case, part of an electric field of the first antenna element 851 which is a radiation element may be excited to the second antenna element 853 which is a proximity element. In this case, an angle formed by a corresponding face and a polarization direction of an electric field in a radiation source region 880 of the corresponding face is an angle of 0 degrees in case of a cross-pol component and an angle of 90 degrees in case of a co-pol component. Therefore, since a horizontal component decreases while maximizing a size of a vertical component of a signal, a CPR is improved. In the disclosure, an angle formed by a line and a plane means a smaller angle (e.g., an acute angle) or an identical angle (e.g., a right angle) between two angles formed based on a line.

In the disclosure, as a parameter for improving performance of a polarized antenna, a CPR and an XPD are taken for example. For example, although the performance and effect of the antenna structure according to various embodiments of the disclosure, a causal relationship between the performance/effect and a construction, and a correlation between the performance/effect and a deployment shape of the construction are described by taking the CPR for example in the disclosure, a specific metric is not construed as limiting an embodiment of the disclosure. For example, it is obvious that another metric indicating independence between polarizations may be used to describe and identify embodiments of the disclosure. This is because the independence between the polarizations causes improvement of channel quality through improvement of a polarization diversity gain.

A dual-polarized antenna is described in the disclosure for example as a structure for improving independence between polarizations. However, it is obvious that a scope of the disclosure is applicable to any type of antennas as long as it is a structure in which a cross-pol component caused by a signal to be applied is smaller in size that the antenna 201 having the rectangular patch of FIG. 2A. For example, even if it is not necessarily a structure for dual polarizations, embodiments of the disclosure may be applied, like in an antenna (e.g., the first antenna 701 of FIG. 7A) implemented with a single polarization. In addition, it is obvious that, even if it is not a structure in which antennas are closely spaced (e.g., a distance between antenna elements is 0.74λ), an embodiment of the disclosure may be applied to implement high CPR performance.

Figure 9:
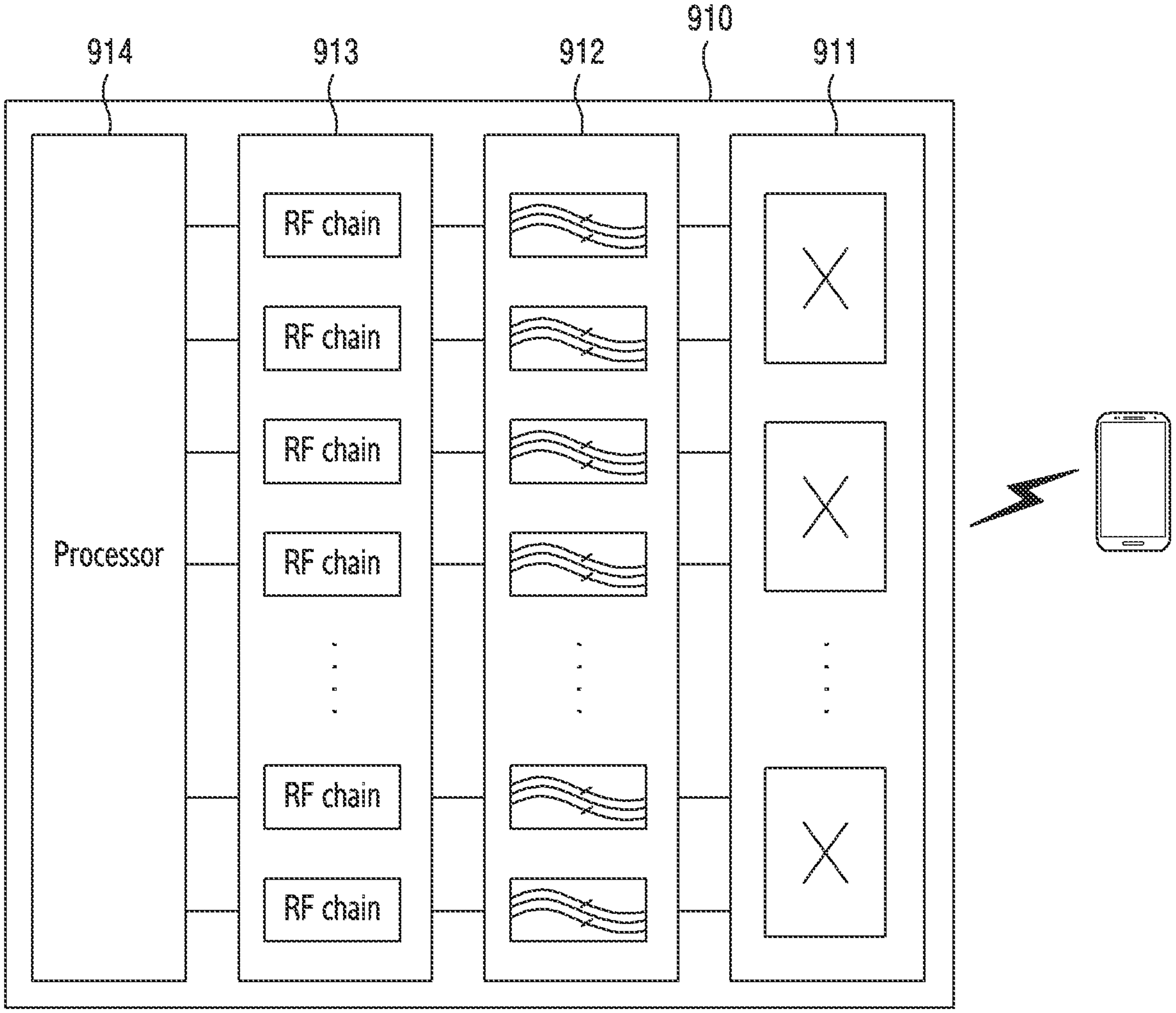
FIG. 9 illustrates a functional configuration of an electronic device according to an embodiment of the disclosure.

FIG. 9 illustrates a functional configuration of an electronic device according to an embodiment of the disclosure.

Referring to FIG. 9, an electronic device 910 may be one of the base station 110 or terminal 120 of FIG. 1. According to an embodiment of the disclosure, the electronic device 910 may be an MMU. Not only the antenna structure itself mentioned through FIGS. 1, 2A, 2B, 2C, 2D, 2E, 2F, 3, 4A, 4B, 5, 6A, 6B, 7A, 7B, 7C, 7D, 7E, 7F, 7G, 7H, 8A, 8B, 8C, and 8D but also an electronic device including the antenna structure are also included in embodiments of the disclosure. In order to improve CPR performance between closely spaced antennas, the electronic device 901 may include a plurality of antennas with a shape having a corresponding face perpendicular to the aforementioned co-pol component of the electric field.

Referring to FIG. 9, a functional configuration of the electronic device 910 is illustrated. The electronic device 910 may include an antenna unit 911, a filter unit 912, a radio frequency (RF) processing unit 913, and a control unit 914.

The antenna unit 911 may include a plurality of antennas. The antenna performs functions for transmitting and receiving signals through a radio channel. The antenna may include a radiator formed on a substrate (e.g., a PCB). The antenna may radiate an up-converted signal on the radio channel or obtain a signal radiated by another device. Each antenna may be referred to as an antenna element or an antenna device. In some embodiments of the disclosure, the antenna unit 911 may include an antenna array in which a plurality of antenna elements constitute an array. The antenna unit 911 may be electrically coupled to the filter unit 912 through RF signal lines. The antenna unit 911 may be mounted on a PCB including a plurality of antenna elements. The PCB may include a plurality of RF signal lines to couple each antenna element and a filter of the filter unit 912. The RF signal lines may be referred to as a feeding network. The antenna unit 911 may provide a received signal to the filter unit 912 or may radiate the signal provided from the filter unit 912 into the air.

According to various embodiments of the disclosure, the antenna unit 911 may include at least one antenna module having a dual-polarized antenna. The dual-polarized antenna may be, for example, a cross-pol (x-pol) antenna. The dual-polarized antenna may include two antenna elements corresponding to different polarizations. For example, the dual-polarized antenna may include a first antenna element having a polarization of +45° and a second antenna element having a polarization of −45°. It is obvious that the polarization may be formed of other polarizations orthogonal to each other, in addition to +45° and −45°. Each antenna element may be coupled to a feeding line, and may be electrically coupled to the filter unit 912, the RF processing unit 913, and the control unit 914 to be described below.

According to various embodiments of the disclosure, the dual-polarized antenna may be a patch antenna (or a micro-strip antenna). Since the dual-polarized antenna has a form of a patch antenna, it may be easily implemented and integrated as an array antenna. Two signals having different polarizations may be input to respective antenna ports. Each antenna port corresponds to an antenna element. For high efficiency, it is required to optimize a relationship between a co-pol characteristic and a cross-pol characteristic between the two signals having the different polarizations. In the dual-polarized antenna, the co-pol characteristic indicates a characteristic for a specific polarization component and the cross-pol characteristic indicates a characteristic for a polarization component different from the specific polarization component. According to various embodiments of the disclosure, the antenna shape according to embodiments of the disclosure may be configured to improve a CPR by allowing only a co-pol component to be present as much as possible in a radiation source region of an antenna. Therefore, the antenna shape according to embodiments of the disclosure may be required essentially to improve communication performance in an array antenna in which antenna elements shall be closely spaced, since a plurality of antennas are densely located.

The filter unit 912 may perform filtering to transmit a signal of a desired frequency. The filter unit 912 may perform a function for selectively identifying a frequency by forming a resonance. In some embodiments of the disclosure, the filter unit 912 may structurally form the resonance through a cavity including a dielectric. In addition, in some embodiments of the disclosure, the filter unit 912 may form a resonance through elements which form inductance or capacitance. In addition, in some embodiments of the disclosure, the filter unit 912 may include a bulk acoustic wave (BAW) filter or a surface acoustic wave (SAW) filter. The filter unit 912 may include at least one of a band pass filter, a low pass filter, a high pass filter, and a band reject filter. For example, the filter unit 912 may include RF circuits for obtaining a signal of a frequency band for transmission or a frequency band for reception. The filter unit 912 according to various embodiments of the disclosure may electrically couple the antenna unit 911 and the RF processing unit 913 to each other.

The RF processing unit 913 may include a plurality of RF paths. The RF path may be a unit of a path through which a signal received through an antenna or a signal radiated through the antenna passes. At least one RF path may be referred to as an RF chain. The RF chain may include a plurality of RF elements. The RF elements may include an amplifier, a mixer, an oscillator, a digital-to-analog converter (DAC), an analog-to-digital converter (ADC), or the like. For example, the RF processing unit 913 may include an up converter which up-converts a digital transmission signal of a baseband to a transmission frequency, and a DAC which converts the converted digital transmission signal into an analog RF transmission signal. The converter and the DAC constitute a transmission path in part. The transmission path may further include a power amplifier (PA) or a coupler (or a combiner). In addition, for example, the RF processing unit 913 may include an ADC which converts an analog RF reception signal into a digital reception signal and a down converter which converts the digital reception signal into a digital reception signal of a baseband. The ADC and the down converter constitute a reception path in part. The reception path may further include a low-noise amplifier (LNA) or a coupler (or a divider). RF parts of the RF processing unit may be implemented on a PCB. The electronic device 910 may include a structure in which the antenna unit 911, the filter unit 912, and the RF processing unit 913 are layered in that order. The antennas and the RF parts of the RF processing unit may be implemented on the PCB, and filters may be repeatedly fastened between one PCB and another PCB to constitute a plurality of layers.

The control unit 914 may provide overall control to the electronic device 910. The control unit 914 may include various modules for performing communication. The control unit 914 may include at least one processor such as a modem. The control unit 914 may include modules for digital signal processing. For example, the control unit 914 may include a modem. In data transmission, the control unit 914 generates complex symbols by encoding and modulating a transmission bit-stream. In addition, for example, in data reception, the control unit 914 restores a reception bit-stream by demodulating and decoding a baseband signal. The control unit 914 may perform functions of a protocol stack required in a communication standard.

The functional configuration of the electronic device 910 is described in FIG. 9 as an apparatus capable of utilizing an antenna structure of the disclosure. However, the example of FIG. 9 is only a configuration for utilizing the antenna structure according to various embodiments of the disclosure described with reference to FIGS. 1, 2A, 2B, 2C, 2D, 2E, 2F, 3, 4A, 4B, 5, 6A, 6B, 7A, 7B, 7C, 7D, 7E, 7F, 7G, 7H, 8A, 8B, and 8C, and embodiments of the disclosure are not limited to components of the apparatus of FIG. 9. Therefore, an antenna module including the antenna structure, a communication device of a difference construction, and an antenna construction itself may also be understood as an embodiment of the disclosure.

According to embodiments of the disclosure, an antenna device may include: a first feeding line for a first polarization; and an antenna. The antenna may include a radiation face and at least one corresponding face on which the first polarization is formed. An angle formed by the at least one corresponding face and a direction of the first polarization may be smaller than an angle formed by the at least one corresponding face and a direction of a polarization perpendicular to the first polarization.

According to an embodiment of the disclosure, the antenna may be configured such that, in each of at least one corresponding face, an acute angle or a right angle formed by a cross-pol for a direction of the first polarization with respect to a corresponding face is smaller than an acute angle formed by a co-pol for the direction of the first polarization with respect to the corresponding face.

According to an embodiment of the disclosure, the antenna device may further include a second feeding line for a second polarization. The antenna may include a dual-polarization antenna including a first pol for the first feeding line and a second pol for the second feeding line.

According to an embodiment of the disclosure, the dual-polarized antenna may include a shape in which at least one corner of a square patch is folded.

According to an embodiment of the disclosure, the dual-polarized antenna may include a shape in which at least one corner of the square patch is cut.

According to an embodiment of the disclosure, the dual-polarized antenna may include a shape of being folded along a tangent line on which a signal of the first feeding line is perpendicular to a polarization direction in a patch.

According to an embodiment of the disclosure, the dual-polarized antenna may include a shape of being folded along a tangent line on which a signal of the second feeding line is perpendicular to the polarization direction in the patch.

According to an embodiment of the disclosure, the dual-polarized antenna may include an octagonal patch. The first polarization may be generated at two sides facing each other in the octagonal patch. The second polarization may be generated at the other two sides facing each other in the octagonal patch.

According to an embodiment of the disclosure, the first polarization may be +45° polarization, and the second polarization may be −45° polarization.

According to an embodiment of the disclosure, the antenna may include a face vertical to a co-pol component of a signal of the first feeding line and horizontal to a cross-pol component of the signal of the first feeding line.

According to an embodiment of the disclosure, the antenna may include a face vertical to a co-pol component of the second feeding line and horizontal to a cross-pol component of the signal of the second feeding line.

According to an embodiment of the disclosure, the dual-polarized antenna may include a shape in which a co-pol component generated by a signal of the second feeding line is disposed to be larger than a cross-pol component.

According to embodiments of the disclosure, a massive multiple input multiple output (MIMO) unit (MMU) device may include: at least one processor; and an antenna array including a plurality of antenna elements. Aa first antenna element among the plurality of antenna elements may be electrically coupled to a first feeding line for a first polarization. The first antenna element may include a radiation face and at least one corresponding face on which the first polarization is formed. An angle formed by the at least one corresponding face and a direction of the first polarization may be smaller than an angle formed by the at least one corresponding face and a direction of a polarization perpendicular to the first polarization.

According to an embodiment of the disclosure, the antenna may be configured such that, in each of at least one corresponding face, an acute angle or a right angle formed by a cross-pol for a direction of the first polarization with respect to a corresponding face is smaller than an acute angle formed by a co-pol for the direction of the first polarization with respect to the corresponding face.

According to an embodiment of the disclosure, the MMU device may further include a second feeding line for a second polarization. The antenna may include a dual-polarization antenna including a first pol for the first feeding line and a second pol coupled to the second feeding line.

According to an embodiment of the disclosure, the dual-polarized antenna may include a shape in which at least one corner of the square patch is cut.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna device comprising:

a first antenna including a first edge, a second edge and a third edge connected with the first edge and the second edge;

a second antenna;

a first feeding line connected to the first edge of the first antenna and configured to apply a first signal to the first edge of the first antenna in a first feeding direction perpendicular to the first edge, wherein the first signal has a first polarization; and a second feeding line connected to the second edge of the first antenna and configured to apply a second signal to the second edge of the first antenna in a second feeding direction perpendicular to the second edge, wherein the second signal has a second polarization, wherein a direction of the first polarization is parallel with the first feeding direction, wherein the second antenna is spaced apart from the first antenna in a direction parallel with the third edge, and wherein the direction of the first polarization of the first signal applied to the first edge is +45 degrees with respect to the direction parallel with the third edge.

2. The antenna device of claim 1, wherein the direction of the first polarization is perpendicular to the first edge and a direction of the second polarization is parallel with the first edge such that a signal having the second polarization is reduced, and wherein the second polarization is a cross polarization over the first polarization.

3. The antenna device of claim 2, wherein the direction of the second polarization is −45 degrees.

4. The antenna device of claim 1, wherein the first antenna has an octagon shape.

5. The antenna device of claim 1, wherein the first antenna further includes a fourth edge facing the first edge, wherein the first antenna includes a first end including the first edge and a second end including the fourth edge, and wherein an electric field for the first signal is concentrated in the first end and the second end.

6. The antenna device of claim 5, wherein the first antenna is a dual polarized antenna, and wherein the first edge and the fourth edge are symmetrical with respect to a center of the first antenna.

7. An antenna module comprising:

a plurality of antennas including a first antenna having an octagon shape and a second antenna having an octagon shape, wherein the first antenna includes a first edge, a second edge, and a third edge connected with the first edge and the second edge;

a first feeding line connected to the first edge of the first antenna and configured to apply a first signal to the first edge of the first antenna in a first feeding direction perpendicular to the first edge, wherein the first signal has a first polarization; and a second feeding line connected to the second edge of the first antenna and configured to apply a second signal to the second edge of the first antenna in a second feeding direction perpendicular to the second edge, wherein the second signal has a second polarization, wherein a direction of the first polarization is parallel with the first feeding direction, wherein the second antenna is spaced apart from the first antenna in a direction parallel with the third edge, and wherein the direction of the first polarization of the first signal applied to the first edge is +45 degrees with respect to the direction parallel with the third edge.

8. The antenna module of claim 7, wherein the direction of the first polarization is perpendicular to the first edge and a direction of the second polarization is parallel with the first edge such that a signal having the second polarization is reduced, and wherein the second polarization is a cross polarization over the first polarization.

9. The antenna module of claim 8, wherein the direction of the second polarization is −45 degrees.

10. The antenna module of claim 7, further comprising:

a third feeding line for the first polarization and a fourth feeding line for the second polarization, wherein the second antenna further includes a fourth edge, a fifth edge and a sixth edge connected with the fourth edge and the fifth edge, wherein the third feeding line is electrically connected to the fourth edge and configured to apply a third signal having the first polarization to the fourth edge of the second antenna in the first feeding direction, and wherein the fourth feeding line is electrically connected to the fifth edge and configured to apply a fourth signal having the second polarization to the fifth edge of the second antenna in the second feeding direction.

11. The antenna module of claim 7, wherein the first antenna further includes a fourth edge facing the first edge, wherein the first antenna includes a first end including the first edge and a second end including the fourth edge, and wherein an electric field for the first signal is concentrated in the first end and the second end.

12. The antenna module of claim 7, wherein the second antenna further includes a fifth edge and a sixth edge facing the fifth edge, and wherein the second antenna includes a third end including the fifth edge and a fourth end including the sixth edge.

13. The antenna module of claim 12, wherein each of the first antenna and the second antenna is a dual polarized antenna, wherein the first edge and the fourth edge are symmetrical with respect to a center of the first antenna, and wherein the fifth edge and the sixth edge are symmetrical with respect to a center of the second antenna.

14. The antenna device of claim 1, wherein the first edge is located in a third quadrant of a plane of the first antenna with respect to a center of the first antenna.

15. The antenna module of claim 7, wherein the first edge is located in a third quadrant of a plane of the first antenna with respect to a center of the first antenna.

* * * * *